US012565213B2

(12) United States Patent
Lee

(10) Patent No.: US 12,565,213 B2
(45) Date of Patent: Mar. 3, 2026

(54) DRIVING ASSISTANCE APPARATUS AND METHOD OF CONTROLLING SAME

(71) Applicant: HL KLEMOVE CORP., Incheon (KR)

(72) Inventor: Jaehwan Lee, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 0 days.

(21) Appl. No.: 18/772,113

(22) Filed: Jul. 13, 2024

(65) Prior Publication Data

US 2025/0171025 A1 May 29, 2025

(30) Foreign Application Priority Data

Nov. 23, 2023 (KR) ........................ 10-2023-0164789

(51) Int. Cl.
*B60W 30/18* (2012.01)
*B60L 7/18* (2006.01)
*G06V 20/58* (2022.01)

(52) U.S. Cl.
CPC ......... *B60W 30/18127* (2013.01); *B60L 7/18* (2013.01); *B60W 30/18072* (2013.01); *G06V 20/58* (2022.01); *B60W 2540/10* (2013.01); *B60W 2540/12* (2013.01)

(58) Field of Classification Search
CPC ..... B60W 30/18127; B60W 30/18072; B60W 2540/12; B60W 2540/10; B60W 2420/403; B60W 2420/10; B60W 2554/802; B60L 7/18; B60L 7/10
See application file for complete search history.

(56) References Cited

U.S. PATENT DOCUMENTS

| | | | | |
|---|---|---|---|---|
| 10,953,756 B2 * | 3/2021 | Bryan | ................... | B60L 53/00 |
| 2018/0043896 A1 | 2/2018 | Lee et al. | | |
| 2020/0164879 A1 * | 5/2020 | Lee | ...................... | B60W 10/06 |
| 2020/0180632 A1 * | 6/2020 | Morita | ................. | B60W 30/14 |
| 2020/0298890 A1 * | 9/2020 | Miyagawa | ...... | B60W 60/00272 |
| 2022/0111734 A1 * | 4/2022 | Sim | ..................... | B60L 15/2009 |
| 2023/0294719 A1 * | 9/2023 | Niu | ........................ | G06V 20/58 |
| | | | | 74/513 |

FOREIGN PATENT DOCUMENTS

| | | |
|---|---|---|
| JP | 10-201008 | 7/1998 |
| KR | 10-1628563 | 6/2016 |
| KR | 10-2160633 | 9/2020 |
| KR | 10-2022-0042544 | 4/2022 |

OTHER PUBLICATIONS

Office Action dated Nov. 17, 2025 for Korean Patent Application No. 10-2023-0164789 and Its English translation provided by Applicant's foreign counsel.

* cited by examiner

*Primary Examiner* — George C Jin
(74) *Attorney, Agent, or Firm* — WOMBLE BOND DICKINSON (US) LLP

(57) ABSTRACT

A driving assistance apparatus can include a camera associated with a vehicle and configured to generate image data around the vehicle and a processor configured to process the image data. The processor may be configured to obtain information on a position of an accelerator pedal of the vehicle and information on a position of a brake pedal of the vehicle and increase a coasting torque for regenerative braking in a driving device of the vehicle on the basis of the image data when the accelerator pedal is located at its original position and the brake pedal is located at its original position.

20 Claims, 13 Drawing Sheets

FIG. 3

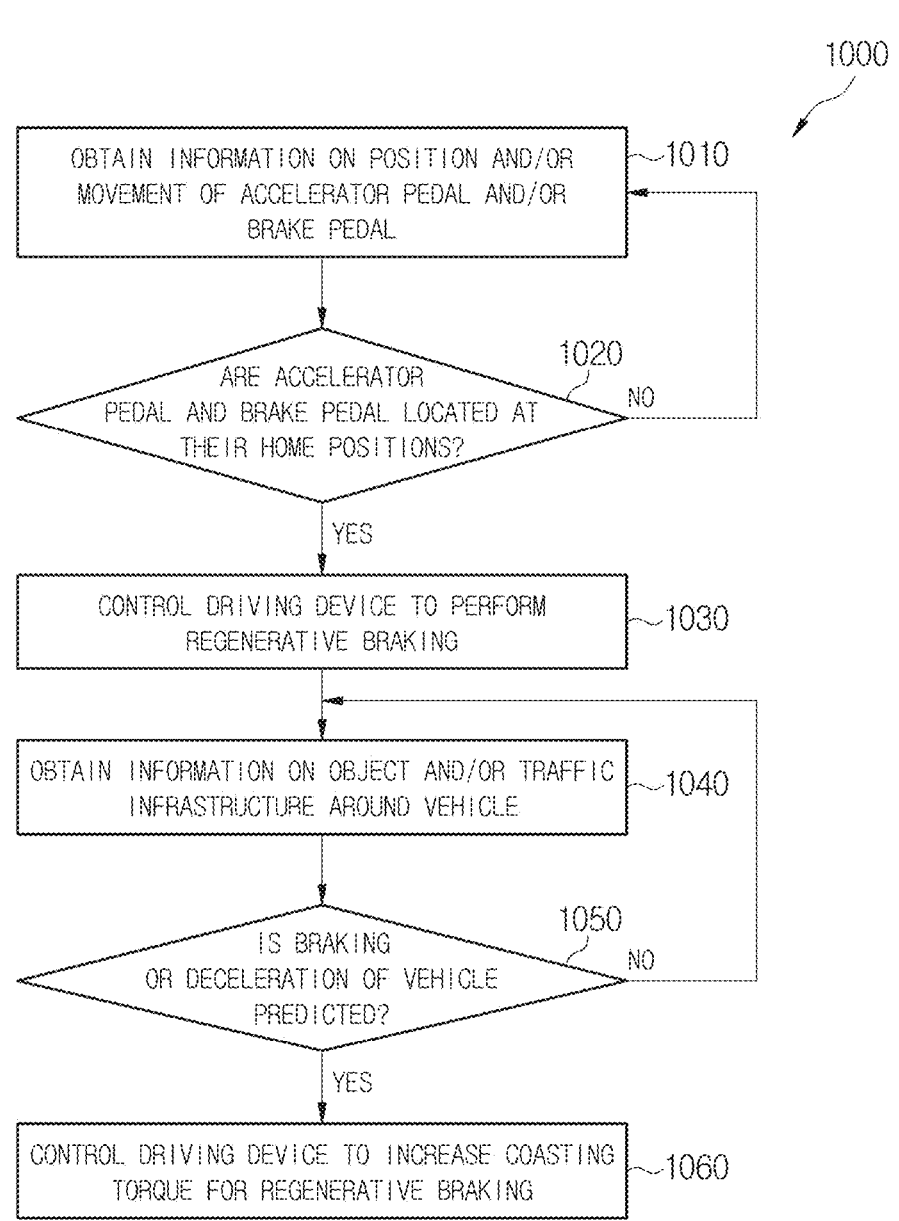

1000

OBTAIN INFORMATION ON POSITION AND/OR MOVEMENT OF ACCELERATOR PEDAL AND/OR BRAKE PEDAL ~1010

ARE ACCELERATOR PEDAL AND BRAKE PEDAL LOCATED AT THEIR HOME POSITIONS? 1020   NO

YES

CONTROL DRIVING DEVICE TO PERFORM REGENERATIVE BRAKING ~1030

OBTAIN INFORMATION ON OBJECT AND/OR TRAFFIC INFRASTRUCTURE AROUND VEHICLE ~1040

IS BRAKING OR DECELERATION OF VEHICLE PREDICTED? 1050   NO

YES

CONTROL DRIVING DEVICE TO INCREASE COASTING TORQUE FOR REGENERATIVE BRAKING ~1060

OBTAIN INFORMATION ON ROAD MARKING IN FRONT OF VEHICLE ~1510

IS ROAD MARKING FOR RIGHT TURN OR LEFT TURN? 1520

NO

YES

INCREASE COASTING TORQUE FOR REGENERATIVE BRAKING ~1530

1500

DRIVING ASSISTANCE APPARATUS AND METHOD OF CONTROLLING SAME

CROSS-REFERENCE TO RELATED APPLICATION

This application claims the priority to and benefit from Korean Patent Application No. 10-2023-0164789, filed on Nov. 23, 2023 in the Korean Intellectual Property Office, the disclosure of which is incorporated herein by reference herein in its entirety.

BACKGROUND

1. Field

Embodiments of the present disclosure generally relate to a driving assistance apparatus which assists the driving of a vehicle, and a method of controlling the same.

2. Description of the Related Art

Vehicles are the most common transportation means, and the number of people using vehicles is increasing. Due to the development of vehicle technology, there are advantages of making long-distance transportation and life easier, and the like. However, in places with high population density, as road traffic conditions worsen, traffic congestion often becomes more serious.

An advanced driver assistance system (ADAS) are automated technologies that assist drivers with the safe operation of a vehicle and enhances safety and driving. For example, the ADAS actively provides information on a vehicle state, a driver state, and/or an external environment to reduce the burden on the driver and improve convenience. Driver assistance systems are developing into driving assistance systems or autonomous driving systems for not only assisting the driver in driving but also assisting the driving of a vehicle or allowing a vehicle to drive by itself.

The driving assistance system can collect information on an external environment of a vehicle and process the collected information. In addition, the driving assistance system can identify an object and design a route for the vehicle to travel on the basis of a result of processing the collected information.

In addition, recently, interest in and research on eco-friendly vehicles such as electric vehicles or hybrid vehicles are increasing. For instance, the eco-friendly vehicle may include a driving motor capable of driving the vehicle and a battery capable of providing power to the driving motor, and energy can be recovered using the driving motor and the battery during the braking of the vehicle. As such, braking a vehicle by converting the kinetic energy of the vehicle into electrical energy is called "regenerative braking."

Recently, in the field of vehicle related technology, research on driving assistance systems or autonomous driving systems along with eco-friendly vehicles is being conducted most actively.

SUMMARY

It is one aspect of the present disclosure to provide a driving assistance apparatus capable of controlling the regenerative braking of a vehicle on the basis of information on an environment around the vehicle, and a method of controlling the same.

According to an embodiment of the present disclosure, a driving assistance apparatus and a method of controlling the same may control the regenerative braking of a vehicle on the basis of information on an obstacle or object interfering with the driving of the vehicle.

According to another embodiment of the present disclosure, a driving assistance apparatus and a method of controlling the same may control the regenerative braking of a vehicle on the basis of information on traffic infrastructure such as a traffic light, a road marking, or a sign.

In accordance with one aspect of the present disclosure, a driving assistance apparatus includes a camera which is installed on a vehicle and obtains image data around the vehicle and a processor which processes the image data. The processor obtains information on a position of an accelerator pedal of the vehicle and information on a position of a brake pedal of the vehicle and increases a coasting torque for regenerative braking in a driving device of the vehicle on the basis of the image data when the accelerator pedal is located at its home position and the brake pedal is located at its home position.

The processor may increase a preset value of the coasting torque on the basis of the image data when at least one of the accelerator pedal or the brake pedal is not located at its home position.

The processor may determine whether the vehicle will decelerate or brake on the basis of the image data and increase the coasting torque on the basis of the determination of deceleration or brake of the vehicle.

The processor may restore the increased coasting torque.

The processor may determine a time to a collision with a preceding vehicle of the vehicle on the basis of the image data and increase the coasting torque on the basis of the determined time to a collision with the preceding vehicle.

The processor may determine a distance to a preceding vehicle of the vehicle on the basis of the image data and increase the coasting torque on the basis of the determined distance to the preceding vehicle.

The processor may identify an object in front of the vehicle on the basis of the image data and increase the coasting torque on the basis of the object in front of the vehicle, the object being at least one of a pedestrian, cyclist, or animal.

The processor may identify a signal of a traffic light in front of the vehicle on the basis of the image data and increase the coasting torque on the basis of the signal of the traffic light being a stop signal.

The processor may identify a road marking printed on a road on which the vehicle travels on the basis of the image data and increase the coasting torque on the basis of the road marking being at least one of a stop marking, a crosswalk warning marking, a right turn marking, or a left turn marking.

The processor may identify a speed limit on a road on which the vehicle travels on the basis of the image data and increase the coasting torque on the basis of a traveling speed of the vehicle being greater than the speed limit.

In accordance with another aspect of the present disclosure, a method of controlling a driving assistance apparatus, which includes a camera installed on a vehicle, includes obtaining image data around the vehicle from the camera, obtaining information on a position of an accelerator pedal of the vehicle and information on a position of a brake pedal of the vehicle, and increasing a coasting torque for regenerative braking in a driving device of the vehicle on the basis of the image data when the accelerator pedal is located at its home position and the brake pedal is located at its home position.

The method may further include increasing a preset value of the coasting torque on the basis of the image data when at least one of the accelerator pedal or the brake pedal is not located at its home position.

The increasing of the coasting torque may include determining whether the vehicle will decelerate or brake on the basis of the image data and increasing the coasting torque on the basis of the determination of deceleration or brake of the vehicle.

The method may further include restoring the increased coasting torque.

The increasing of the coasting torque may include determining a time to a collision with a preceding vehicle of the vehicle on the basis of the image data and increasing the coasting torque on the basis of the determined time to a collision with the preceding vehicle.

The increasing of the coasting torque may include determining a distance to a preceding vehicle of the vehicle on the basis of the image data and increasing the coasting torque on the basis of the determined distance to the preceding vehicle.

The increasing of the coasting torque may include identifying an object in front of the vehicle on the basis of the image data and increasing the coasting torque on the basis of the object in front of the vehicle, the object being at least one of a pedestrian, cyclist, or animal.

The increasing of the coasting torque may include identifying a signal of a traffic light in front of the vehicle on the basis of the image data and increasing the coasting torque on the basis of the signal of the traffic light being a stop signal.

The increasing of the coasting torque may include identifying a road marking printed on a road on which the vehicle travels on the basis of the image data and increasing the coasting torque on the basis of the road marking being at least one of a stop marking, a crosswalk warning marking, a right turn marking, or a left turn marking.

The increasing of the coasting torque may include identifying a speed limit on a road on which the vehicle travels on the basis of the image data and increasing the coasting torque on the basis of a traveling speed of the vehicle being greater than the speed limit.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a flowchart illustrating a method of controlling a coasting torque for regenerative braking by a driving assistance apparatus according to one embodiment;

DETAILED DESCRIPTION

Figure 1:
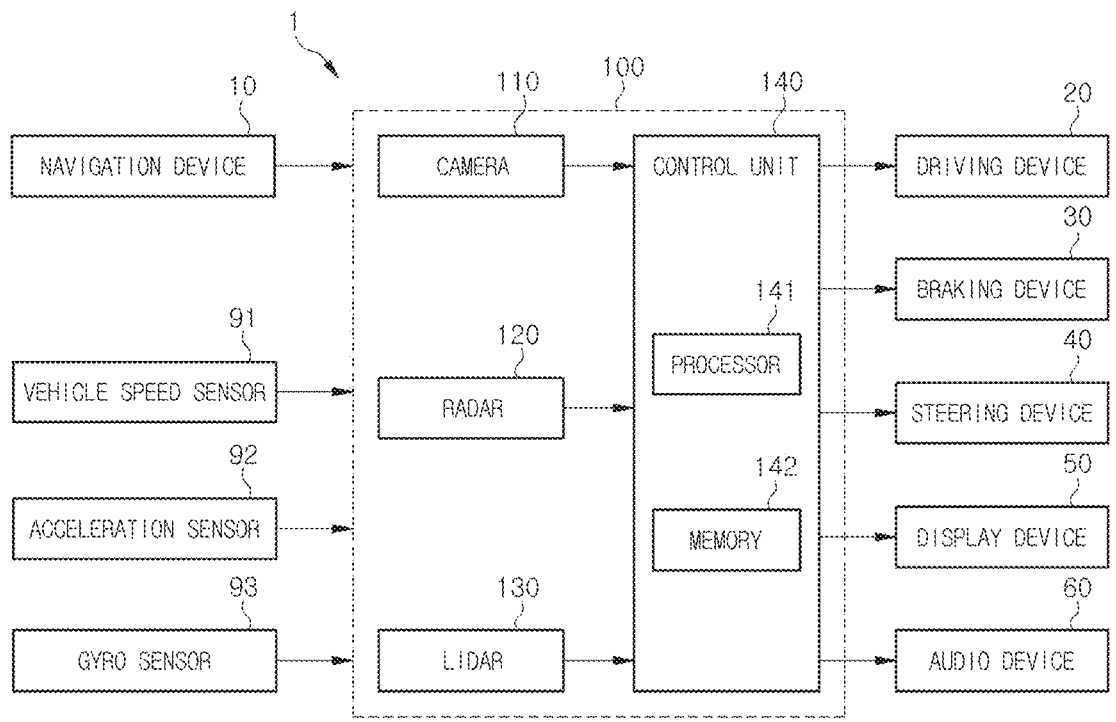
FIG. 1 is a block diagram illustrating a configuration of a vehicle including a driving assistance apparatus according to one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
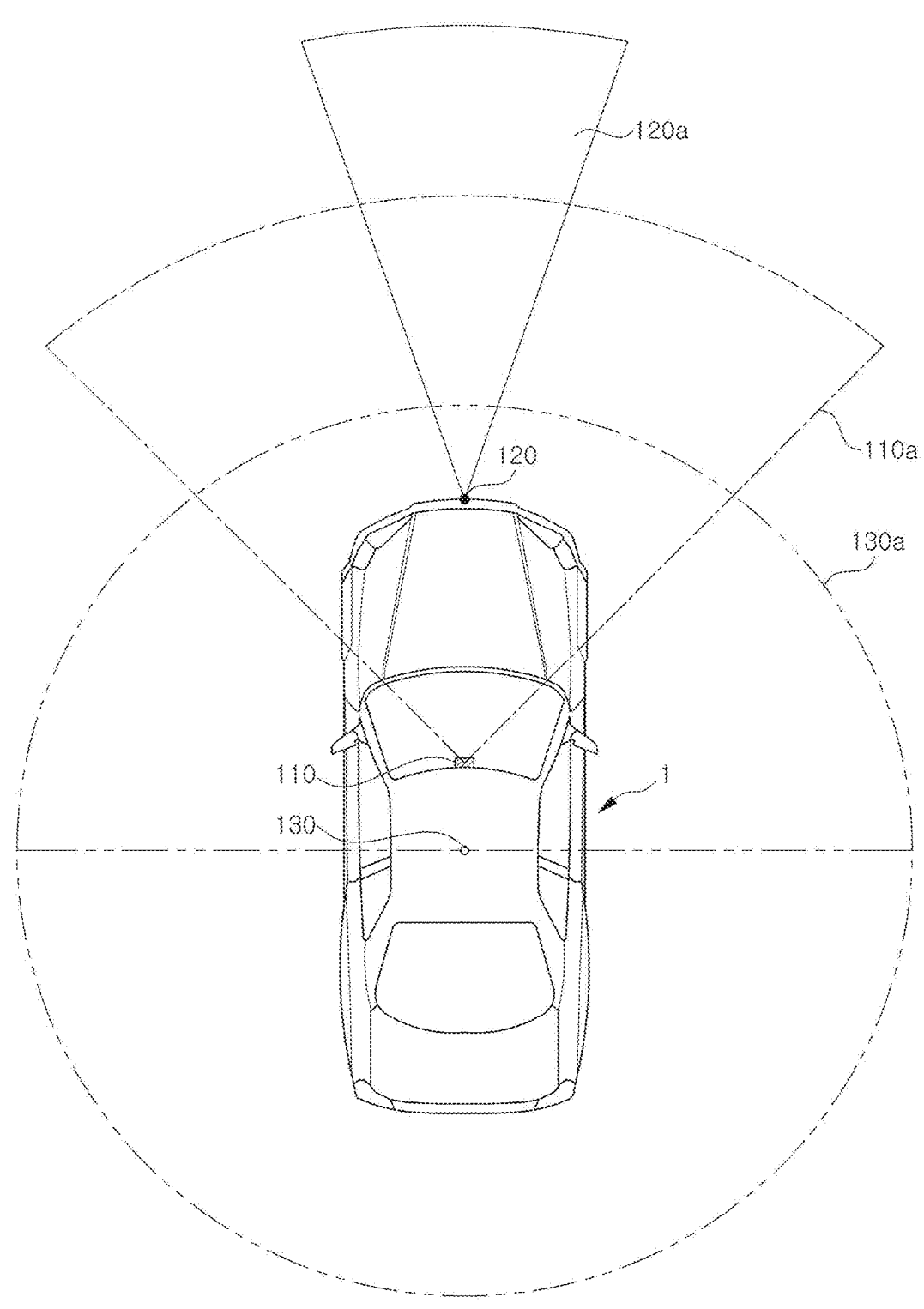
FIG. 2 is a view illustrating the field of views of sensor modules included in a driving assistance apparatus according to one embodiment.

FIG. 1 is a block diagram illustrating a configuration of a vehicle including a driving assistance apparatus according to one embodiment. FIG. 2 is a view illustrating the field of views of sensor modules included in a driving assistance apparatus according to one embodiment.

As illustrated in FIG. 1, a vehicle 1 may include a navigation device 10, a driving device 20, a braking device 30, a steering device 40, a display device 50, an audio device 60, and/or a driving assistance apparatus 100. The vehicle 1 may further include sensors 91, 92, and 93 for detecting the movement (dynamics) of the vehicle 1. For example, the vehicle 1 may include a vehicle speed sensor 91 for detecting a longitudinal speed of the vehicle 1, an acceleration sensor 92 for detecting a longitudinal acceleration and a lateral acceleration of the vehicle 1, and/or a gyro sensor 93 for detecting a yaw rate, a roll rate, and a pitch rate of the vehicle 1.

The above components may communicate with each other through a vehicle communication network. For example, the electronic devices 10, 20, 30, 40, 50, 60, 91, 92, 93, and 100 included in the vehicle 1 may transmit or receive data to or from each other through Ethernet, media oriented systems transport (MOST), FlexRay, a controller area network (CAN), a local interconnect network (LIN), or the like.

The navigation device or navigator 10 may generate a route to a destination input by a driver and provide and guide the generated route to the driver. The navigation device 10 may receive a global navigation satellite system (GNSS) signal from the GNSS, and identify an absolute location (coordinates) of the vehicle 1 on the basis of the GNSS signal. The navigation device 10 may generate the route to the destination on the basis of a location (coordinates) of the destination input by the driver and the current location (coordinates) of the vehicle 1.

The navigation device 10 may provide map data and location information of the vehicle 1 to the driving assistance apparatus 100. In addition, the navigation device 10 may provide information on the route to the destination to the driving assistance apparatus 100. For example, the navigation device 10 may provide information on a distance to an on-ramp to enter a new road or information on a distance to an off-ramp to exit a road on which the vehicle 1 is currently traveling to the driving assistance apparatus 100.

The driving device 20 may provide power for driving the vehicle 1, for example, for driving or accelerating the vehicle 1 in response to the driver's intention or the control of a controller of the vehicle 1 to accelerate transmitted through an accelerator pedal or a request or command of the driving assistance apparatus 100.

The driving device 20 may include, for example, but not limited to, a motor as a driving source for moving the vehicle and a battery for providing energy (e.g. electrical energy) to the motor which is the driving source. For example, an electric vehicle may include a motor as a driving source.

While the vehicle 1 accelerates, the motor may receive power from the battery and convert the power (e.g. electrical energy) into rotational energy (e.g. kinetic energy). In addition, while the vehicle 1 decelerates or brakes, the motor may convert rotational energy (e.g. kinetic energy) into power (e.g. electrical energy), and the converted power may be stored in the battery. In other words, the motor may perform regenerative braking for deceleration or braking.

However, a device for recovering energy is not limited to the motor. For example, the driving device 20 may optionally further include an alternator. The alternator may convert rotational energy (e.g. kinetic energy) into power (e.g. electrical energy) while the vehicle 1 decelerates or brakes. In other words, the alternator may perform regenerative braking for deceleration or braking.

Alternatively or additionally, the driving device 20 may optionally include an internal combustion engine. For example, a hybrid vehicle may include both a motor and an internal combustion engine.

As described above, the driving device 20 may include only the motor or include the motor and the internal combustion engine, drive or accelerate the vehicle 1, and also decelerate or brake the vehicle 1 in some cases.

While the vehicle 1 is being driven, when the driver's intention to accelerate (e.g. operation of an accelerator pedal) is not detected and the driver's intention to brake (e.g. operation of a brake pedal) is not detected, the vehicle 1 may decelerate naturally.

In the conventional vehicle including an internal combustion engine, the vehicle decelerates naturally due to the inertia of the vehicle or the frictional force of the internal combustion engine of the vehicle without additional control. However, in an eco-friendly vehicle including a motor as a driving source, regenerative braking may be used for implementing natural deceleration generated in conventional vehicles.

According to an embodiment of the present disclosure, while the vehicle 1 is being driven, when the driver's intention to accelerate (e.g. operation of the accelerator pedal) is not detected and the driver's intention to brake (e.g. operation of a brake pedal) is not detected, the driving device 20 may perform regenerative braking for natural deceleration of the vehicle 1. As such, driving the vehicle 1 without the driver's intending to decelerate or brake (not necessarily including a neutral gear state) is called "coasting driving in non-neutral." In addition, a braking torque for regenerative braking for natural deceleration of the vehicle 1 during the coasting driving in non-neutral is called "coasting torque." The driving device 20 may control the amount of the coasting torque according to a command of the driver, a command of the driving assistance apparatus, or the like.

The braking device 30 may provide a braking force for braking the vehicle 1, for example, for decelerating or stopping the vehicle 1 in response to the driver's intent to brake through the brake pedal and/or a request or command of the driving assistance apparatus 100.

The steering device 40 may change a traveling direction of the vehicle 1, for example, steer the vehicle 1 in response to a steering intention of the driver through a steering wheel and/or a request or command of the driving assistance apparatus 100.

The display device 50 may include, for example, but not limited to, a cluster, a head-up display, a center fascia monitor, and the like, and may output or provide various types of information and entertainment to the driver through images and sounds. For example, the display device 50 may display driving information of the vehicle 1, a warning message, and the like to the driver.

The audio device 60 may include a plurality of speakers, and provide various types of information and entertainment to the driver through sound. For example, the audio device 60 may provide driving information of the vehicle 1, a warning message or sound, and the like to the driver.

The driving assistance apparatus 100 may communicate with the navigation device 10, the plurality of sensors 91, 92, and 93, the driving device 20, the braking device 30, the steering device 40, the display device 50, and the audio device 60 through the vehicle communication network. The driving assistance apparatus 100 may receive information on a route to a destination and location information of the vehicle 1 from the navigation device 10 and obtain information on a vehicle speed, acceleration, and/or an angular speed of the vehicle 1 from the plurality of sensors 91, 92, and 93.

The driving assistance apparatus 100 may provide various functions for safety to the driver. For example, the driving assistance apparatus 100 may provide lane departure warning (LDW), lane keeping assist (LKA), high beam assist (HBA), autonomous emergency braking (AEB), traffic sign recognition (TSR), adaptive cruise control (ACC), blind spot detection (BSD) functions, etc.

The driving assistance apparatus 100 may include a camera 110, a radar 120, a lidar 130, or a control unit or controller 140. The driving assistance apparatus 100 is not limited to that illustrated in FIG. 1. For example, the camera 110, the radar 120, the lidar 130, and the control unit 140 illustrated in FIG. 1 do not correspond to essential components of the driving assistance apparatus 100, and one or some of the components illustrated in FIG. 1 may be omitted.

The camera 110, the radar 120, the lidar 130, or the control unit 140 may be separately provided. For example, the control unit 140 may be installed in a housing separated from a housing of the camera 110, a housing of the radar 120, and a housing of the lidar 130. The control unit 140 may transmit or receive data to or from the camera 110, the radar 120, or the lidar 130 through a vehicle communication network such as a broadband network.

In addition, at least some of the camera 110, the radar 120, the lidar 130, or the control unit 140 may be integrally provided. For example, the camera 110 and the control unit 140 may be provided in a first housing, the radar 120 and the control unit 140 may be provided in a second housing, or the lidar 130 and the control unit 140 may be provided in a third housing.

The camera 110 may capture an image around the vehicle 1 and obtain image data around the vehicle 1. For example, as illustrated in FIG. 2, the camera 110 may be installed on a front windshield of the vehicle 1 and have a forward field of view 110a of the vehicle 1.

For instance, the camera 110 may include a plurality of lenses and an image sensor. The image sensor may include a plurality of photodiodes for converting light into an electrical signal, and the plurality of photodiodes may be arrayed in a two-dimensional matrix form.

The image data may include information on another vehicle, a pedestrian, or a cyclist, a lane line (e.g. a marking which distinguishes lanes), or traffic infrastructure located around the vehicle 1.

The driving assistance apparatus 100 may include an image processor configured to process the image data of the camera 110. For example, the image processor may be integrally provided with the camera 110 or integrally provided with the control unit 140.

The image processor may obtain the image data from the image sensor of the camera 110 and identify an object around the vehicle 1 by processing the image data. For example, the image processor may generate a track representing the object around the vehicle 1 through image processing and classify the track. The image processor may identify whether the track belongs to another vehicle, a pedestrian, a cyclist, or the like.

The image processor may transmit data on the track (or a location or classification of the track, hereinafter, referred to as a "camera track") around the vehicle 1 to the control unit 140.

The radar 120 may emit radio waves toward the surroundings of the vehicle 1 and detect an object around the vehicle 1 on the basis of reflected radio waves reflected by the surrounding object. For example, as illustrated in FIG. 2, the radar 120 may be installed on a grill or bumper of the vehicle 1 and may have a forward field of sensing 120a of the vehicle 1.

The radar 120 may include a transmission antenna (or transmission antenna array) configured to emit radio waves toward the surroundings of the vehicle 1 and a reception antenna (or reception antenna array) configured to receive reflected radio waves reflected by an object.

For instance, the radar 120 may obtain radar data from a radio wave transmitted by the transmission antenna and a reflected radio wave received by the reception antenna. The radar data may include location information (for example, distance information) and/or speed information of objects located in front of the vehicle 1.

The driving assistance apparatus 100 may include a signal processor configured to process the radar data of the radar 120. For example, the signal processor may be integrally provided with the radar 120 or integrally provided with the control unit 140.

The signal processor may obtain radar data from the reception antenna of the radar 120 and may generate a track representing an object by clustering the reflection points of a reflected signal. For example, the signal processor may obtain a distance to a track on the basis of a time difference between a transmission time of the transmitted radio wave and a reception time of the reflected radio wave and obtain a relative speed of the track on the basis of a difference between a frequency of the transmitted radio wave and a frequency of the reflected radio wave.

The signal processor may transmit data on the track around the vehicle 1 obtained from the radar data (or the distance to and the relative speed of the track, hereinafter referred to as a "radar track") to the control unit 140.

The lidar 130 may transmit light (for example, infrared light) toward the surroundings of the vehicle 1 and detect an object around the vehicle 1 on the basis of reflected light reflected by the surrounding object. For example, as illustrated in FIG. 2, the lidar 130 may be installed on a roof of the vehicle 1 and may have a field of view 130a facing all directions around the vehicle 1.

The lidar 130 may include a light source (for example, a light-emitting diode, a light-emitting diode array, a laser diode, or a laser diode array) for emitting light (for example, infrared light or the like) and a light sensor (for example, a photodiode or photodiode array) for receiving light (for example, infrared light or the like). In addition, the lidar 130 may further include a driving device or actuator for rotating the light source and/or the light sensor as necessary.

While the light source and/or the light sensor rotates, the lidar 130 may emit light through the light source, receive light reflected by an object through the light sensor, and thus obtain lidar data.

Lidar data may include, for example, but not limited to, relative locations (distances and/or directions of surrounding objects) and/or relative speeds of objects around the vehicle 1.

The driving assistance apparatus 100 may include a signal processor configured to process the lidar data of the lidar 130. For example, the signal processor may be integrally provided with the lidar 130 or integrally provided with the control unit 140.

The signal processor may generate a track representing an object by clustering reflection points of reflected light. For example, the signal processor may obtain a distance to an object on the basis of a time difference between a light emission time and a light reception time. In addition, the signal processor may obtain a direction (or angle) of the object with respect to a traveling direction of the vehicle 1 when the light sensor receives reflected light on the basis of a direction in which the light source emits light.

The signal processor may transmit data on a track (or a distance to and a relative speed of the track, hereinafter, referred to as a "lidar track") around the vehicle 1 obtained from the lidar data to the control unit 140.

The control unit or controller 140 may be electrically or communicationally connected to the camera 110, the radar 120, or the lidar 130. In addition, the control unit 140 may be connected to the navigation device 10, the driving device 20, the braking device 30, the steering device 40, the display device 50, the audio device 60, or the plurality of sensors 91, 92, and 93 through a vehicle communication network NT.

The control unit 140 may process data received from a plurality of sensors included in the vehicle 1, for example, but not limited to, a camera track (or image data) of the camera 110, a radar track (or radar data) of the radar 120, and/or a lidar track (or lidar data) of the lidar 130 and provide a control signal to the driving device 20, the braking device 30, and/or the steering device 40.

The control unit 140 may include a processor 141 and a memory 142.

The memory 142 may store a program and/or data for processing image data, radar data, and/or lidar data. In addition, the memory 142 may store a program and/or data for generating driving, braking, steering signals.

The memory 142 may store image data received from the camera 110, radar data received from the radar 120, and/or lidar data received from the lidar 130 and store the results of processing of the image data, radar data, and/or lidar data performed by the processor 141.

In addition, the memory 142 may store a high definition (HD) map. The HD map may include detailed information on a surface of a road or intersection such as lane lines, signal lights, intersections, and road signs. Particularly, in the HD map, land markings (for example, lane lines, signals, intersections, road signs, and the like) encountered while the vehicle travels may be implemented in a three-dimensional manner.

The memory 142 may include not only a volatile memory such as a static random access memory (SRAM) and a dynamic random access memory (DRAM), but also a non-volatile memory such as a flash memory, a read-only memory (ROM), and an erasable programmable ROM (EPROM).

The processor 141 may include an image processor configured to process image data of the camera 110, a signal processor configured to process radar data of the radar 120 and/or lidar data of the lidar 130, or a micro control unit (MCU) configured to generate driving, braking, and/or steering signals. However, two or more of the image processor, the signal processor, and the MCU may be integrated into one processor if necessary.

The processor 141 may process a camera track of the camera 110, a radar track of the radar 120, and/or a lidar track of the lidar 130. For example, the processor 141 may fuse a camera track, a radar track, or a lidar track and output a fused track.

The processor 141 may generate a driving signal, a braking signal, and/or a steering signal for controlling the driving device 10, the braking device 30, and/or the steering device 40, respectively, on the basis of processing the camera track, the radar track, the lidar track, or the fused track. For example, the processor 141 may estimate the risk of collision between tracks and the vehicle 1. The processor 141 may control the driving device 10, the braking device 30, and/or the steering device 40 to brake or steer the vehicle 1 on the basis of the risk of collision between the tracks and the vehicle 1.

The processor 141 may obtain information on the driver's intention to accelerate and/or information on the driver's intention to brake from the driving device 10 and/or the braking device 30. Specifically, the processor 141 may obtain information on a position and movement of the accelerator pedal from the driving device 10 and information on a position and movement of the brake pedal from the braking device 30.

The processor 141 may control the driving device 10 to regeneratively brake the vehicle 1 on the basis of a position or movement of the accelerator pedal and/or the brake pedal. For example, when the accelerator pedal does not move from its original position and the brake pedal does not move from its original position, the processor 141 may control the driving device 10 to generate a coasting torque for regenerative braking of the vehicle 1.

The processor 141 may obtain information on an object and information on traffic infrastructure around the vehicle 1 on the basis of the processing of the camera track, the radar track, the lidar track, or the fused track and may control the driving device 10 to adjust the amount of coasting torque for regenerative braking of the vehicle 1 on the basis of the information on the object and the information on the traffic infrastructure around the vehicle 1.

For example, when a preceding vehicle decelerates or stops, the processor 141 may control the driving device 10 to increase the amount of coasting torque for regenerative braking of the vehicle 1. When an estimated time to collision with the preceding vehicle is smaller than a reference time, the processor 141 may control the driving device 10 to increase the amount of coasting torque for regenerative braking of the vehicle 1.

As another example, when a pedestrian, cyclist, or animal which is moving toward a traveling path of the vehicle 1 in front of the vehicle 1 is detected, the processor 141 may control the driving device 10 to increase the amount of coasting torque for regenerative braking of the vehicle 1. When a movement path of the pedestrian, cyclist, or animal in front of the vehicle 1 intersects the traveling path of the vehicle 1, the processor 141 may control the driving device 10 to increase the amount of coasting torque for regenerative braking of the vehicle 1.

As another example, when a traffic signal of a traffic light requiring stopping of the vehicle 1 and a stop marking (or stop line) of a road are detected in front of the vehicle 1, the processor 141 may control the driving device 10 to increase the amount of coasting torque for regenerative braking of the vehicle 1. The traffic signal of a traffic light requiring stopping of the vehicle 1 may be, for example, but not limited to, a red light or a stop signal light (e.g. a flashing red light). When the traffic signal of the traffic light requiring stopping of the vehicle 1 and the stop marking of the road are detected in front of the vehicle 1 and the vehicle 1 is predicted to go past the stop marking, the processor 141 may control the driving device 10 to increase the amount of coasting torque for regenerative braking of the vehicle 1. In addition, when a crosswalk warning marking is detected in front of the vehicle 1, the processor 141 may control the driving device 10 to increase the amount of coasting torque for regenerative braking of the vehicle 1.

As another example, when a road marking for a right turn (in a right-hand drive country) or a left turn (in a left-hand drive country) is detected in front of the vehicle 1, the processor 141 may control the driving device 10 to increase the amount of coasting torque for regenerative braking of the vehicle 1.

As another example, when a road marking for deceleration is detected in front of the vehicle 1, the processor 141 may control the driving device 10 to increase the amount of coasting torque for regenerative braking of the vehicle 1.

As another example, when a speed limit sign is detected in front of the vehicle 1, the processor 141 may control the driving device 10 to increase the amount of coasting torque for regenerative braking of the vehicle 1. For instance, when a traveling speed of the vehicle 1 is greater than the speed limit indicated by the sign detected in front of the vehicle 1, the processor 141 may control the driving device 10 to increase the amount of coasting torque for regenerative braking of the vehicle 1.

As another example, when a sign indicating a school zone is detected in front of the vehicle 1, the processor 141 may control the driving device 10 to increase the amount of coasting torque for regenerative braking of the vehicle 1.

The processor 141 may obtain information on a route to a destination, a speed limit on the route, and/or a location of a traffic enforcement camera from the navigation device 10 and control the driving device 10 to adjust the amount of coasting torque for regenerative braking of the vehicle 1 on the basis of the route to the destination and the speed limit on the route.

For example, when a route to a destination obtained from the navigation device 10 includes a change of direction (for example, a left turn or right turn) in front of the driving route of the vehicle 1, the processor 141 may control the driving device 10 to increase the amount of coasting torque for regenerative braking of the vehicle 1.

As another example, the processor 141 may control the driving device 10 to increase the amount of coasting torque for regenerative braking of the vehicle 1 on the basis of a speed limit on a route obtained from the navigation device 10. When a traveling speed of the vehicle 1 is greater than the speed limit on the route obtained from the navigation device 10, the processor 141 may control the driving device 10 to increase the amount of coasting torque for regenerative braking of the vehicle 1.

As another example, when a distance to a traffic enforcement camera obtained from the navigation device 10 is smaller than a reference distance, the processor 141 may control the driving device 10 to increase the amount of coasting torque for regenerative braking of the vehicle 1.

As described above, the control unit 140 may provide a driving signal, a braking signal, or a steering signal on the basis of image data of the camera 110, radar data of the radar 120, or lidar data of the lidar 130.

Hereinafter, an exemplary embodiment in which the driving assistance apparatus 100 controls the coasting torque for regenerative braking of the vehicle 1 when the driver has no intention to accelerate or brake will be described.

FIG. 3 is a flowchart illustrating a method of controlling a coasting torque for regenerative braking by a driving assistance apparatus according to one embodiment.

A method 1000 for controlling a coasting torque for regenerative braking of the vehicle 1 by the driving assistance apparatus 100 will be described with reference to FIG. 3. However, one or more operations shown in FIG. 3 may not be essential for the method 1000, and one or some of the operations shown in FIG. 3 may be omitted.

At operation 1010, the driving assistance apparatus 100 may obtain information on a position and/or movement of the accelerator pedal and/or the brake pedal of the vehicle 1.

The driving device 20 of the vehicle 1 may detect the movement of the accelerator pedal and/or the position of the accelerator pedal by the driver. For example, the driving device 20 may detect a speed of the displacement of the accelerator pedal moved by the driver and/or a position of the accelerator pedal.

The driving device 20 may provide information on the position and/or movement of the accelerator pedal through the vehicle communication network. The driving assistance apparatus 100 may receive the information on the position and/or movement of the accelerator pedal through the vehicle communication network. The driving assistance apparatus 100 may identify whether the driver moves the accelerator pedal, that is, the driver intends to accelerate, on the basis of the information on the position and/or movement of the accelerator pedal.

The braking device 30 of the vehicle 1 may detect the movement of the brake pedal by the driver and/or the position of the brake pedal. For example, the driving device 20 may detect a speed of the displacement of the brake pedal moved by the driver and/or the position of the brake pedal.

The braking device 30 may provide information on the position and/or movement of the brake pedal through the vehicle communication network. The driving assistance apparatus 100 may receive the information on the position and/or movement of the brake pedal through the vehicle communication network. The driving assistance apparatus 100 may identify whether the driver has moved the brake pedal, that is, the driver intends to brake, on the basis of information on the position and/or movement of the brake pedal.

At operation 1020, the driving assistance apparatus 100 may identify whether the accelerator pedal and the brake pedal are located at their original positions (e.g. a position of a pedal not pressed by the driver).

The control unit 140 of the driving assistance apparatus 100 may obtain information on the position and/or movement of the accelerator pedal and/or the brake pedal through the vehicle communication network.

The control unit 140 may identify whether the accelerator pedal is located at its original position (e.g. a not-pressed position), that is, whether the driver intends to accelerate, on the basis of the information on the position and/or movement of the accelerator pedal. In addition, the control unit 140 may identify whether the brake pedal is located at its original position (e.g. a not-pressed position), that is, whether the driver intends to brake, on the basis of the information on the position and/or movement of the brake pedal.

When at least one of the accelerator pedal or the brake pedal is not located at its original position (NO in operation 1020), the driving assistance apparatus 100 may perform operation 1010 of obtaining information on the position and/or movement of the accelerator pedal and/or the brake pedal again.

When the accelerator pedal is not located at its original position, that is, the accelerator pedal is moved, the control unit 140 may identify that the driver intends to accelerate. In addition, when the brake pedal is not located at its original position, that is, the brake pedal is moved, the control unit 140 may identify that the driver intends to brake.

When at least one of the driver's intention to accelerate or intent to brake is identified, the driving assistance apparatus 100 may not intervene in the driving of the vehicle 1

At operation 1030, when both the accelerator pedal and the brake pedal are located at their original positions (YES in 1020), the driving assistance apparatus 100 may control the driving device 20 to perform regenerative braking.

When the accelerator pedal is located at its original position, that is, the accelerator pedal is not moved, the control unit 140 may identify that the driver does not intend to accelerate. In addition, when the brake pedal is located at its original position, that is, the brake pedal is not moved, the control unit 140 may identify that the driver does not intend to brake.

When it is identified that the driver does not intend to accelerate or brake, the driving assistance apparatus 100 may control the driving device 20 to perform regenerative braking so as to naturally decelerate the vehicle 1. In other words, the driving assistance apparatus 100 may control the driving device 20 to generate a coasting torque for implementing engine braking.

The battery can be charged by such regenerative braking, and thus the fuel efficiency or electric efficiency of the vehicle 1 can be improved.

At operation 1040, the driving assistance apparatus 100 may obtain information on an object and/or traffic infrastructure around the vehicle 1 while controlling the driving device 20 to perform regenerative braking.

The control unit 140 may obtain information on the object and/or traffic infrastructure around the vehicle 1 through the camera 110, the radar 120, and/or the lidar 130.

For example, the control unit 140 may obtain image data, the radar data, and/or the lidar data around the vehicle 1 through the camera 110, the radar 120, and/or the lidar 130. The control unit 140 may generate an image track, a radar track, and/or a lidar track of a surrounding object by processing the image data, radar data, and/or lidar data. The surrounding object may include another vehicle, a pedestrian, a cyclist, an animal, or the like. The control unit 140 may generate a fused track on the basis of fusing the image track, the radar track, and/or the lidar track. The driving assistance apparatus 100 may identify a position and a speed of the object on the basis of a position and a speed of the fused track.

The control unit 140 may identify traffic infrastructure such as a traffic light, a sign, a road marking, or the like located around the vehicle 1 on the basis of processing the image data around the vehicle 1. For example, the control unit 140 may identify a green, a red, and a yellow of the traffic light. The control unit 140 may identify a speed limit sign, a school zone, and the like and also identify a speed limit indicated by the speed limit sign. The control unit 140 may identify a lane line marking, a stop marking, a crosswalk warning marking, a right turn marking, and any marking printed on a road.

At operation 1050, the driving assistance apparatus 100 may identify whether braking or deceleration of the vehicle 1 is predicted or required.

The control unit 140 may identify whether the braking or deceleration of the vehicle 1 is predicted or required on the basis of information on the object and/or information on the traffic infrastructure.

For example, when collision with another vehicle, a pedestrian, a cyclist, an animal, or the like in front of the vehicle 1 is predicted, the control unit 140 may determine that braking or deceleration of the vehicle 1 is predicted or required. When a traffic signal of a traffic light requiring stopping of the vehicle 1 and a stop marking on a road are identified in front of the vehicle 1, the control unit 140 may determine that braking or deceleration of the vehicle 1 is required. When a crosswalk warning marking is identified in front of the vehicle 1, the control unit 140 may determine that deceleration of the vehicle 1 is required. When a speed limit sign or school zone sign is identified in front of the vehicle 1, the control unit 140 may determine that deceleration of the vehicle 1 is required. In addition, when a right turn marking (or a left turn marking) on a road is identified in front of the vehicle 1, the control unit 140 may determine that deceleration of the vehicle 1 is required.

When the braking or deceleration of the vehicle 1 is not predicted or required (NO in operation 1050), the driving assistance apparatus 100 may perform operation 1040 of obtaining information on an object and/or traffic infrastructure around the vehicle 1 again.

When the braking or deceleration of the vehicle 1 is not predicted or required, the driving assistance apparatus 100 may control the driving device 20 to continue regenerative braking with a predetermined amount of coasting torque.

At operation 1060, when it is identified that braking or deceleration of the vehicle 1 is predicted or required (YES in operation 1050), the driving assistance apparatus 100 increases the coasting torque for regenerative braking.

The driving assistance apparatus 100 may increase the coasting torque (or the level of the coasting torque) for regenerative braking to avoid collision with an object around the vehicle 1, to comply with a traffic regulation, or to make a safe change of direction. Accordingly, a deceleration rate can be increased by the regenerative braking, thereby quickly performing the braking or deceleration of the vehicle 1.

In addition, in order to prevent, suppress, or minimize a sudden change in braking torque during the driving of the vehicle 1 without the driver's intention to accelerate or brake, the driving assistance apparatus 100 may linearly, gradually, or slowly increase the coasting torque for regenerative braking.

After the coasting torque is increased, the driving assistance apparatus 100 may obtain information on an object and/or traffic infrastructure around the vehicle 1. In addition, the driving assistance apparatus 100 may identify whether the braking or deceleration of the vehicle 1 is predicted or required. When braking or deceleration of the vehicle 1 is not predicted or required after the coasting torque is increased, the driving assistance apparatus 100 may decrease the coasting torque. For example, the driving assistance apparatus 100 may linearly, gradually, or slowly decrease the coasting torque for regenerative braking.

As described above, when it is identified that the braking or deceleration of the vehicle 1 is predicted or required during the driving of the vehicle 1 without the driver's intention to accelerate or brake (e.g. coasting driving in non-neutral), the driving assistance apparatus 100 may increase the coasting torque for regenerative braking.

Accordingly, the vehicle 1 can be braked or decelerated more quickly, and the fuel efficiency or electric efficiency of the vehicle 1 can be improved.

Figure 4:
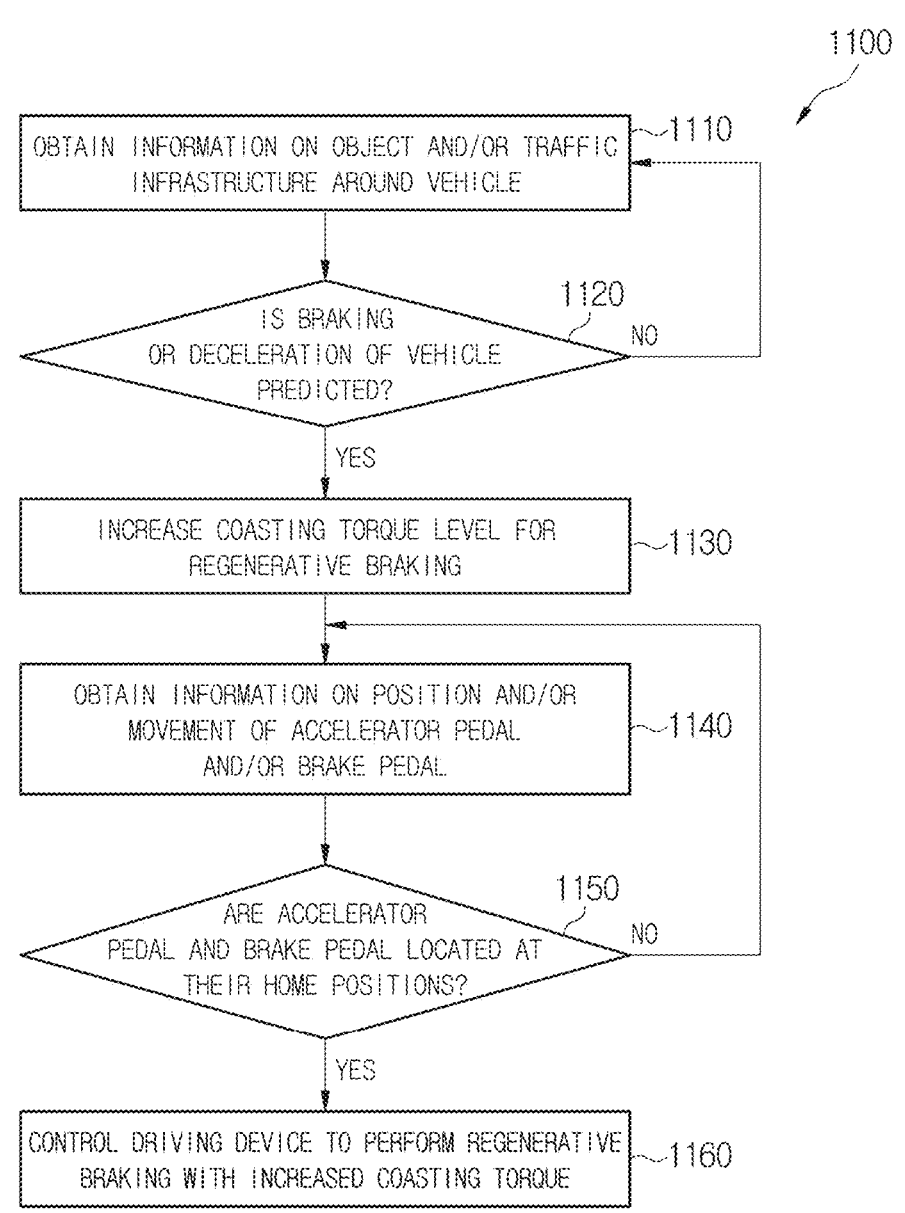
FIG. 4 is a flowchart illustrating a method of controlling a coasting torque for regenerative braking by a driving assistance apparatus according to one embodiment.

FIG. 4 is a flowchart illustrating a method of controlling a coasting torque for regenerative braking by a driving assistance apparatus according to one embodiment.

A method 1100 for controlling a coasting torque for regenerative braking of the vehicle 1 by the driving assistance apparatus 100 will be described with reference to FIG. 4. However, one or more operations shown in FIG. 4 may not be essential for the method 1100, and one or some of the operations shown FIG. 4 may be omitted.

At operation 1110, the driving assistance apparatus 100 may obtain information on an object and/or traffic infrastructure around the vehicle 1, and, at operation 1120, the driving assistance apparatus 100 may identify whether braking or deceleration of the vehicle 1 is predicted or required.

Operation 1110 and operation 1120 may be the same as or similar to operation 1040 and operation 1050 shown in FIG. 3, respectively.

At operation 1130, when it is identified that the braking or deceleration of the vehicle 1 is predicted or required (YES in operation 1120), the driving assistance apparatus 100 may increase a coasting torque level for regenerative braking (1130). The control unit 140 of the driving assistance apparatus 100 may increase a coasting torque before the vehicle 1 is driven without the driver's intention to accelerate or brake (e.g. before coasting driving in non-neutral). In other words, the control unit 140 may increase a preset value of the coasting torque for coasting driving in non-neutral. As such, as the preset value of the coasting torque is increased, a deceleration rate can increase due to regenerative braking during coasting driving in non-neutral, and the braking or deceleration of the vehicle 1 can be quickly performed.

In addition, after the coasting torque is increased, the driving assistance apparatus 100 may obtain information on an object and/or traffic infrastructure around the vehicle 1. The driving assistance apparatus 100 may identify whether the braking or deceleration of the vehicle 1 is predicted or required. After the coasting torque is increased, when braking or deceleration of the vehicle 1 is not predicted or required, the driving assistance apparatus 100 may decrease the preset value of the coasting torque level, that is, the coasting torque.

After the coasting torque is increased at operation 1130, the driving assistance apparatus 100 may obtain information on a position and/or movement of the accelerator pedal and/or the brake pedal of the vehicle 1 at operation 1140, and may identify whether the accelerator pedal and the brake pedal are located at their original positions (e.g. a position of a pedal not pressed by the driver) at operation 1150.

Operation 1140 and operation 1150 may be the same as or similar to operation 1010 and operation 1020 shown in FIG. 3, respectively.

At operation 1160, when both the accelerator pedal and the brake pedal are located at their original positions (YES in operation 1150), the driving assistance apparatus 100 may control the driving device 20 to perform regenerative braking.

When it is identified that the driver does not intend to accelerate or brake, the driving assistance apparatus 100 may control the driving device 20 to perform regenerative braking so as to naturally decelerate the vehicle 1.

In this case, the driving assistance apparatus 100 may control the driving device 20 to perform the regenerative braking with a coasting torque greater than a basic coasting torque (e.g. a preset normal coasting torque). During coasting driving in non-neutral, the driving device 20 may perform regenerative braking with the coasting torque increased in operation 1130. Accordingly, a deceleration rate can increase due to the regenerative braking, thereby quickly performing the braking or deceleration of the vehicle 1.

As described above, when it is identified that the braking or deceleration of the vehicle 1 is predicted or required while coasting driving in non-neutral is not performed, the driving assistance apparatus 100 may start to apply and increase the coasting torque for regenerative braking. Then, when coasting driving in non-neutral starts, the driving device 20 may perform regenerative braking with the coasting torque increased by the driving assistance apparatus 100.

Accordingly, the vehicle 1 can be more quickly braked or decelerated, and the fuel efficiency or electric efficiency of the vehicle 1 can be improved.

Figure 5:
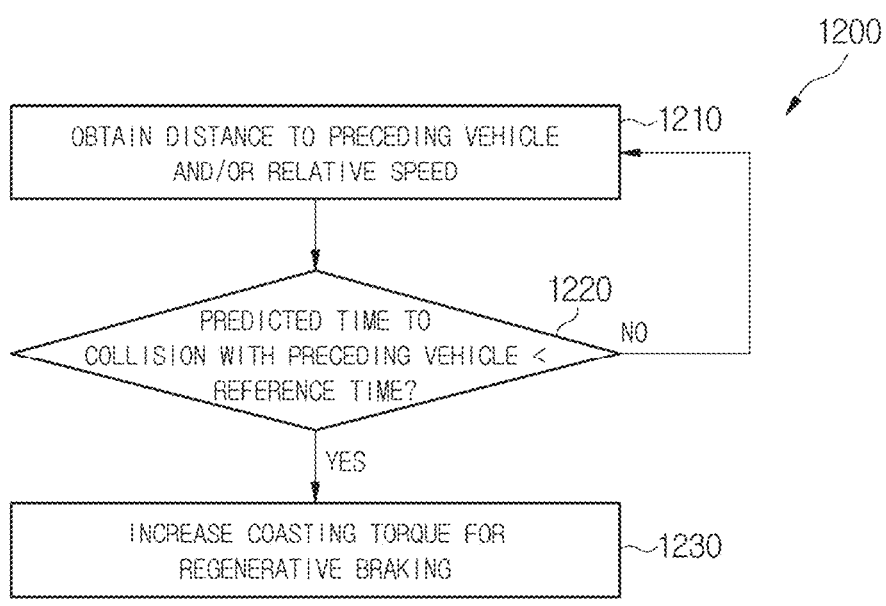
FIG. 5 is a flowchart illustrating a method of controlling a coasting torque to avoid collision with a preceding vehicle by a driving assistance apparatus according to one embodiment.
Figure 6:
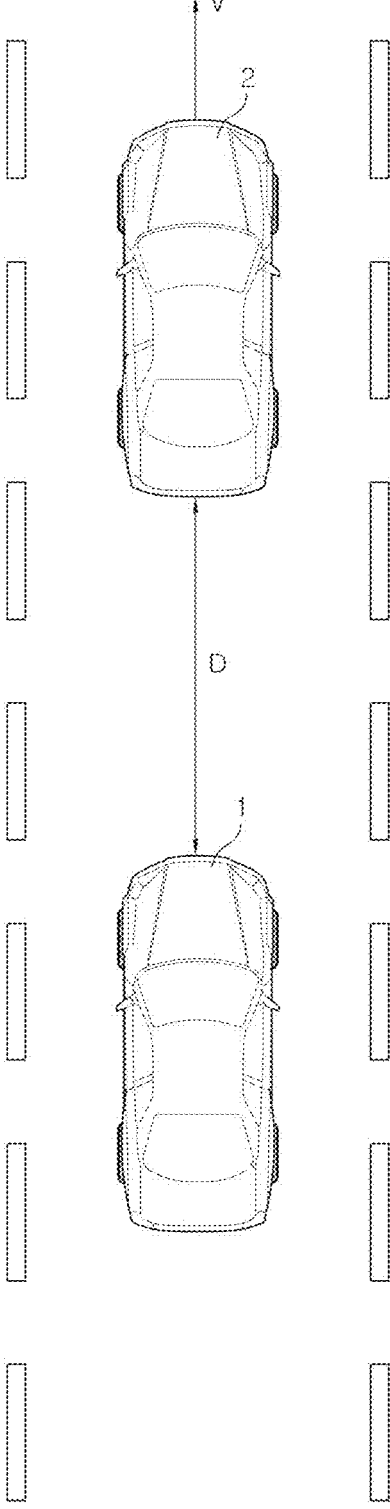
FIG. 6 is a view illustrating an example for avoiding a collision with a preceding vehicle by a driving assistance apparatus according to one embodiment.

FIG. 5 is a flowchart illustrating a method of controlling a coasting torque to avoid collision with a preceding vehicle by a driving assistance apparatus according to one embodiment. FIG. 6 is a view illustrating an example for avoiding a collision with a preceding vehicle by a driving assistance apparatus according to one embodiment.

A method 1200 for controlling a coasting torque to avoid collision with a preceding vehicle 2 by the driving assistance apparatus 100 will be described with reference to FIGS. 5 and 6. However, one or more operations shown in FIG. 5 may not be essential for the method 1200, and one or some of the operations shown in FIG. 5 may be omitted.

At operation 1210, the driving assistance apparatus 100 may obtain a distance D from the host vehicle 1 to the preceding vehicle 2 and/or a relative speed V of the preceding vehicle 2 with respect to the host vehicle 1.

The control unit 140 of the driving assistance apparatus 100 may obtain information on an object around the vehicle 1 through the camera 110, the radar 120, and/or the lidar 130. For example, the control unit 140 may identify whether a surrounding object is another vehicle on the basis of image data or radar data. In addition, the control unit 140 may identify the distance D from the vehicle 1 to the surrounding object and the relative speed V of the surrounding object with respect to the vehicle 1 on the basis of the radar data obtained from the radar 120.

In addition, the control unit 140 may identify a lane marking on a road on which the vehicle 1 is traveling on the basis of the image data obtained from the camera 110. In other words, the driving assistance apparatus 100 may identify the location of the lane marking on the road.

The control unit 140 may identify whether another vehicle is the preceding vehicle 2 traveling in the same lane as the vehicle 1, on the basis of a location of the another vehicle and a location of the lane marking. In addition, as illustrated in FIG. 6, the control unit 140 may identify the distance D from the host vehicle 1 to the preceding vehicle 2 and/or the relative speed V of the preceding vehicle 2 with respect to the host vehicle 1.

At operation 1220, the driving assistance apparatus 100 may identify whether a predicted time to collision with the preceding vehicle 2 is shorter than a reference time.

The control unit 140 may predict the time to collision with the preceding vehicle 2 on the basis of the distance D from the host vehicle 1 to the preceding vehicle 2 and the relative speed V of the preceding vehicle 2 with respect to the host vehicle 1. For example, the control unit 140 may predict the time to collision with the preceding vehicle 2 on the basis of a quotient obtained by dividing the distance D from the host vehicle 1 to the preceding vehicle 2 by the relative speed V of the preceding vehicle 2 with respect to the host vehicle 1.

The control unit 140 may compare the predicted time to collision with the preceding vehicle 2 with a reference time. The reference time may be time for avoiding collision with the preceding vehicle 2 during coasting driving in non-neutral. For example, the reference time may be set empirically or experimentally.

When the predicted time to collision with the preceding vehicle 2 is not shorter than the reference time (NO in operation 1220), the driving assistance apparatus 100 may continue to perform operation 1210 of monitoring the distance D from the host vehicle 1 to the preceding vehicle 2 and the relative speed V of the preceding vehicle 2 with respect to the host vehicle 1.

At operation 1230, when the predicted time to collision with the preceding vehicle 2 is shorter than the reference time (YES in operation 1220), the driving assistance apparatus 100 may increase the coasting torque for regenerative braking.

When the predicted time to collision with the preceding vehicle 2 is shorter than the reference time, collision between the vehicle 1 and the preceding vehicle 2 may be predicted. The control unit 140 may increase the coasting torque (or coasting torque level) for regenerative braking so as to avoid collision between the vehicle 1 and the preceding vehicle 2.

When the vehicle 1 is performing coasting driving in non-neutral, the driving assistance apparatus 100 may linearly, gradually, or slowly increase the coasting torque for regenerative braking. In addition, when the vehicle 1 is not performing coasting driving in non-neutral, the driving assistance apparatus 100 may increase a preset value of the coasting torque for regenerative braking.

Accordingly, the possibility of collision with the preceding vehicle 2 can be reduced, and the fuel efficiency or electric efficiency of the vehicle 1 can be improved.

When the predicted time to collision with the preceding vehicle 2 becomes not shorter than the reference time after the coasting torque is increased, the driving assistance apparatus 100 may decrease the coasting torque for regenerative braking.

The method for controlling a coasting torque for regenerative braking on the basis of a predicted time to collision with the preceding vehicle by the driving assistance apparatus 100 2 has been described with reference to FIGS. 5 and 6, but the present invention is not limited thereto.

The driving assistance apparatus 100 may control a coasting torque for regenerative braking on the basis of a distance D from the host vehicle 1 to the preceding vehicle 2 and/or a relative speed V of the preceding vehicle 2 with respect to the host vehicle 1. For example, when the distance D from the host vehicle 1 to the preceding vehicle 2 is shorter than a reference distance, the driving assistance apparatus 100 may increase the coasting torque for regenerative braking. When the relative speed V of the preceding vehicle 2 with respect to the host vehicle 1 is shorter than a reference speed, the driving assistance apparatus 100 may increase the coasting torque for regenerative braking. In addition, when the relative speed V of the preceding vehicle 2 with respect to the host vehicle 1 decreases, the driving assistance apparatus 100 may increase the coasting torque for regenerative braking.

Figure 7:
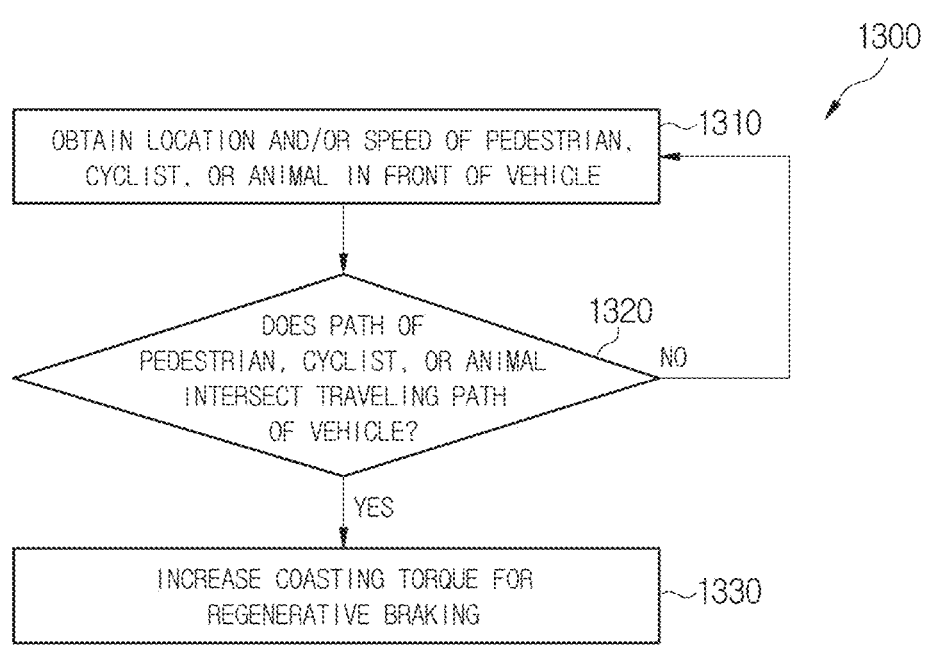
FIG. 7 is a flowchart illustrating a method of controlling a coasting torque to avoid collision with a pedestrian, a cyclist, or an animal by a driving assistance apparatus according to one embodiment.

FIG. 7 is a flowchart illustrating a method of controlling a coasting torque to avoid collision with a pedestrian, a cyclist, or an animal by a driving assistance apparatus according to one embodiment.

A method 1300 for controlling a coasting torque to avoid collision with a pedestrian, a cyclist, or an animal by the driving assistance apparatus 100 will be described with reference to FIG. 7. However, one or more operations shown in FIG. 7 may not be essential for the method 1300, and one or some of the operations shown in FIG. 7 may be omitted.

At operation 1310, the driving assistance apparatus 100 may obtain a location and/or speed of the pedestrian, the cyclist, or the animal.

The control unit 140 of the driving assistance apparatus 100 may obtain information on an object around the vehicle 1 through the camera 110, the radar 120, and/or the lidar 130. For example, the control unit 140 may identify whether the surrounding object is a pedestrian, cyclist, or animal on the basis of image data or radar data. In addition, the control unit 140 may identify the location and/or speed of the object around the vehicle 1 from the radar data obtained from the radar 120.

At operation 1320, the driving assistance apparatus 100 may identify whether a movement path of the pedestrian, the cyclist, or the animal intersects a traveling path of the vehicle 1.

The control unit 140 may determine the traveling path of the vehicle 1 on the basis of a location and speed of the vehicle 1. In addition, the control unit 140 may determine the movement path of the pedestrian, the cyclist, or the animal on the basis of a location and speed of the pedestrian, the cyclist, or the animal.

The control unit 140 may compare the traveling path of the vehicle 1 with the movement path of the pedestrian, the cyclist, or the animal and identify whether the movement path of the pedestrian, the cyclist, or the animal intersects the traveling path of the vehicle 1.

When the movement path of the pedestrian, the cyclist, or the animal does not intersect the traveling path of the vehicle 1 (NO in operation 1320), the driving assistance apparatus 100 may continue to monitor the location and/or speed of the pedestrian, the cyclist, or the animal.

At operation 1330, when the movement path of the pedestrian, the cyclist, or the animal intersects the traveling path of the vehicle 1 (YES in operation 1320), the driving assistance apparatus 100 may increase the coasting torque for regenerative braking.

Operation 1330 may be the same as or similar to operation 1230 shown in FIG. 5. The control unit 140 may increase the coasting torque (or coasting torque level) for regenerative braking to avoid collision with the pedestrian, the cyclist, or the animal. Accordingly, the vehicle 1 can avoid collision with the pedestrian, the cyclist, or the animal, and the fuel efficiency or electric efficiency of the vehicle 1 can be improved.

When the movement path of the pedestrian, the cyclist, or the animal does not intersect the traveling path of the vehicle 1 after the coasting torque is increased, the driving assistance apparatus 100 may decrease the coasting torque for regenerative braking.

The method for controlling the coasting torque for regenerative braking on the basis of whether a movement path of a pedestrian, a cyclist, or an animal intersects a traveling path of the vehicle 1 by in the driving assistance apparatus 100 has been described with reference to FIG. 7, but the present invention is not limited thereto.

According to some embodiments of the present disclosure, the driving assistance apparatus 100 may control the coasting torque for regenerative braking on the basis of a location and/or speed of a pedestrian, a cyclist, or an animal. For example, when a distance to the pedestrian, the cyclist, or animal is shorter than a reference distance, the driving assistance apparatus 100 may increase the coasting torque for regenerative braking. When a speed of the pedestrian, the cyclist, or the animal is greater than a reference speed, the driving assistance apparatus 100 may increase the coasting torque for regenerative braking.

Figure 8:
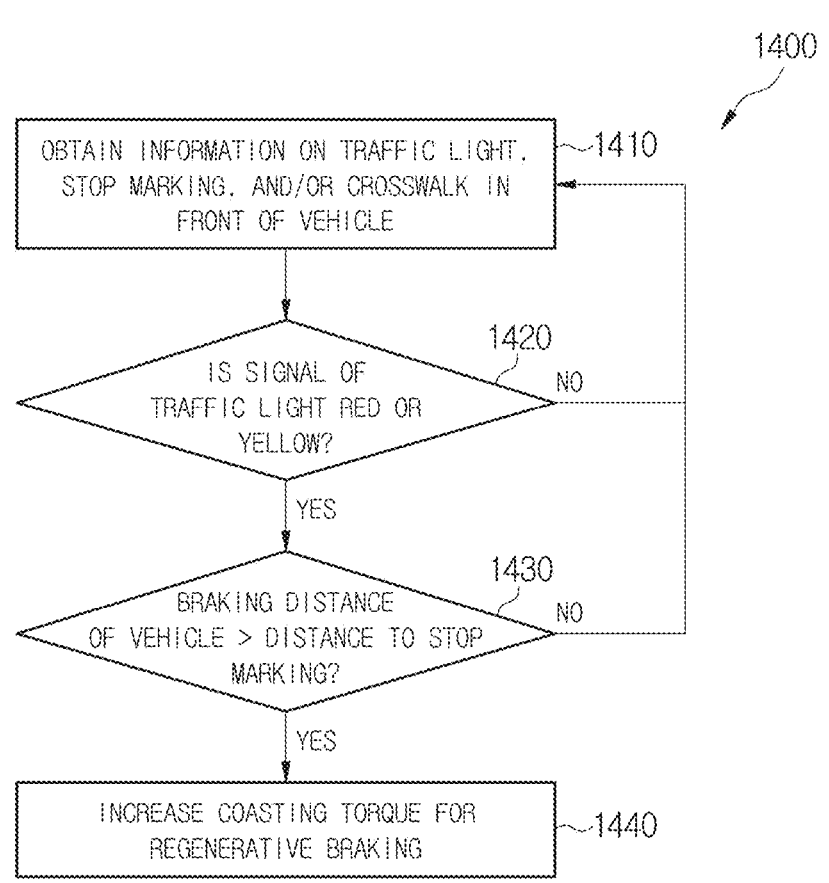
FIG. 8 is a flowchart illustrating a method of controlling a coasting torque to comply with a traffic regulation by a driving assistance apparatus according to one embodiment.
Figure 9:
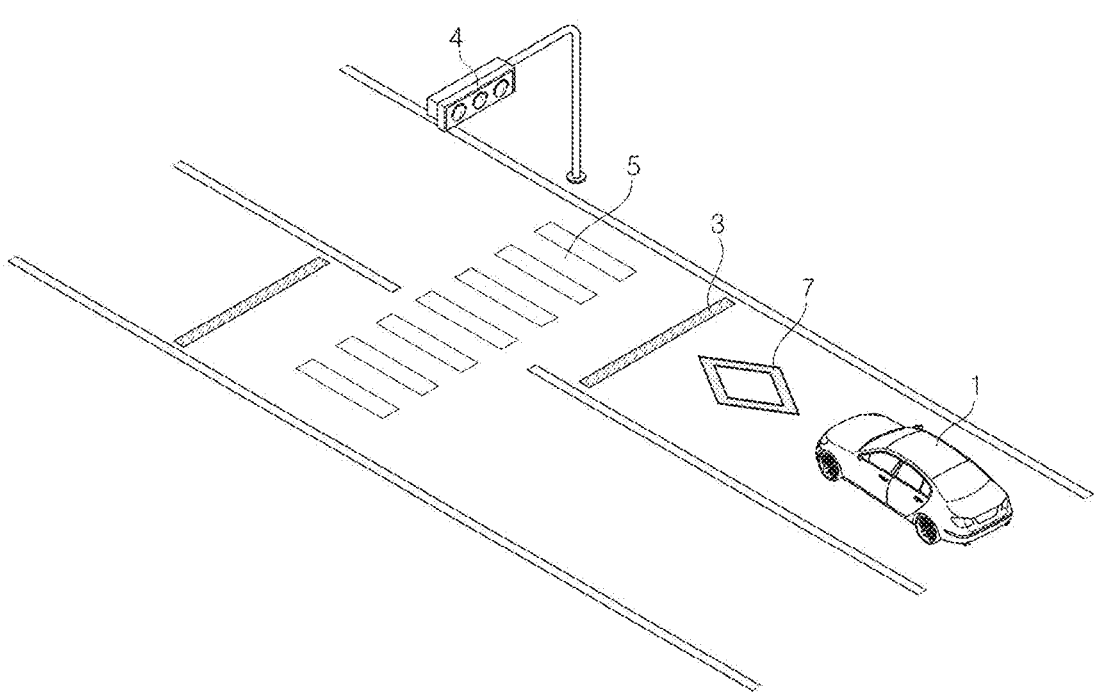
FIG. 9 is a view illustrating one example for complying with a traffic regulation by a driving assistance apparatus according to one embodiment.

FIG. 8 is a flowchart illustrating a method of controlling a coasting torque to comply with a traffic regulation by a driving assistance apparatus according to one embodiment. FIG. 9 is a view illustrating one example for complying with a traffic regulation by a driving assistance apparatus according to one embodiment.

A method 1400 for controlling a coasting torque to comply with a traffic regulation by the driving assistance apparatus 100 will be described with reference to FIGS. 8 and 9. However, one or more operations shown in FIG. 8 may not be essential for the method 1400, and one or some of the operations shown in FIG. 8 may be omitted.

At operation 1410, the driving assistance apparatus 100 may obtain information on a traffic light 4, a stop marking 3, a crosswalk warning marking 7, or a crosswalk 5 in front of the vehicle 1.

The control unit 140 of the driving assistance apparatus 100 may obtain information on traffic infrastructure around the vehicle 1 through one or more sensors included in the vehicle 1 such as the camera 110, the radar 120, and/or the lidar 130. For example, the control unit 140 may identify the traffic light 4, the stop marking 3, the crosswalk warning marking 7, or the crosswalk 5 around the vehicle 1 on the basis of image data. In addition, the control unit 140 may identify a traffic signal indicated on the traffic light 4 on the basis of the image data. The control unit 140 may identify a distance from the vehicle 1 to the stop marking 3 and/or crosswalk 5.

At operation 1420, the driving assistance apparatus 100 may identify whether the traffic signal of the traffic light 4 is red or yellow.

The control unit 140 may identify whether the traffic signal of the traffic light 4 is red or yellow on the basis of the image data of the camera 110. For example, as illustrated in FIG. 9, the control unit 140 may distinguish images of the traffic light 4 on the basis of the image data of the camera 110. The control unit 140 may identify whether the traffic signal of the traffic light 4 is red or yellow on the basis of color data in the image of the traffic light 4.

When the traffic signal of the traffic light 4 is not red or yellow (NO in operation 1420), the driving assistance apparatus 100 may perform operation 1410 of obtaining information on the traffic light 4, the stop marking 3, the crosswalk warning marking 7, or the crosswalk 5 in front of the vehicle 1 again.

At operation 1430, when the signal of the traffic light 4 is red or yellow (YES in operation 1420), the driving assistance apparatus 100 may identify whether a braking distance of the vehicle 1 is shorter than the distance to the stop marking 3 and/or crosswalk 5.

The control unit 140 may calculate the braking distance of the vehicle 1 on the basis of the acceleration (or deceleration) and/or the traveling speed of the vehicle 1. For example, the control unit 140 may obtain information on the acceleration (or deceleration) and/or the traveling speed of the vehicle 1 from the vehicle speed sensor 91 and obtain a braking distance of the vehicle 1 on the basis thereof.

As illustrated in FIG. 9, the control unit 140 may distinguish images of the stop marking 3 and/or crosswalk 5 from the image data of the camera 110. The control unit 140 may calculate the distance to the stop marking 3 and/or crosswalk 5 on the basis of a size and/or location of the image of the stop marking 3 and/or crosswalk 5.

The control unit 140 may compare the braking distance of the vehicle 1 with the distance to the stop marking 3 and/or crosswalk 5 and may identify whether the braking distance of the vehicle 1 is shorter than the distance to the stop marking 3 and/or crosswalk 5.

When the braking distance of the vehicle 1 is not shorter than the distance to the stop marking 3 and/or crosswalk 5 (NO in operation 1430), the driving assistance apparatus 100 may perform operation 1410 of obtaining information on the traffic light 4, stop marking 3, and crosswalk 5 in front of the vehicle 1 again.

At operation 1440, when the braking distance of the vehicle 1 is shorter than the distance to the stop marking 3 and/or crosswalk 5 (YES in operation 1430), the driving assistance apparatus 100 may increase the coasting torque for regenerative braking.

Operation 1440 may be the same as or similar to operation 1230 shown in FIG. 5. When the braking distance of the vehicle 1 is shorter than the distance to the stop marking 3 and/or crosswalk 5, the vehicle 1 is predicted to pass the stop marking 3 and/or enter crosswalk 5. The control unit 140 may increase the coasting torque (or coasting torque level) for regenerative braking to avoid passing the stop marking 3 and/or entering crosswalk 5. Accordingly, the passing of the stop marking 3 and/or the entering of the crosswalk 5 can be avoided, and the fuel efficiency or electric efficiency of the vehicle 1 can be improved.

When the braking distance of the vehicle 1 is not shorter than the distance to the stop marking 3 and/or crosswalk 5 after the coasting torque is increased, the driving assistance apparatus 100 may decrease the coasting torque for regenerative braking.

The method for controlling a coasting torque for regenerative braking on the basis of a braking distance of the vehicle 1 by the driving assistance apparatus 100 has been described with reference to FIGS. 8 and 9, but the present invention is not limited thereto.

According to certain embodiments of the present disclosure, the driving assistance apparatus 100 may control a coasting torque for regenerative braking on the basis of the traffic light 4, the stop marking 3, the crosswalk warning marking 7, and/or the crosswalk 5. For example, when the traffic light 4, the stop marking 3, the crosswalk warning marking 7, and/or the crosswalk 5 is detected, the driving assistance apparatus 100 may increase the coasting torque for regenerative braking. In addition, when a signal of the traffic light 4 is red or yellow, the driving assistance apparatus 100 may increase the coasting torque for regenerative braking.

Figure 10:
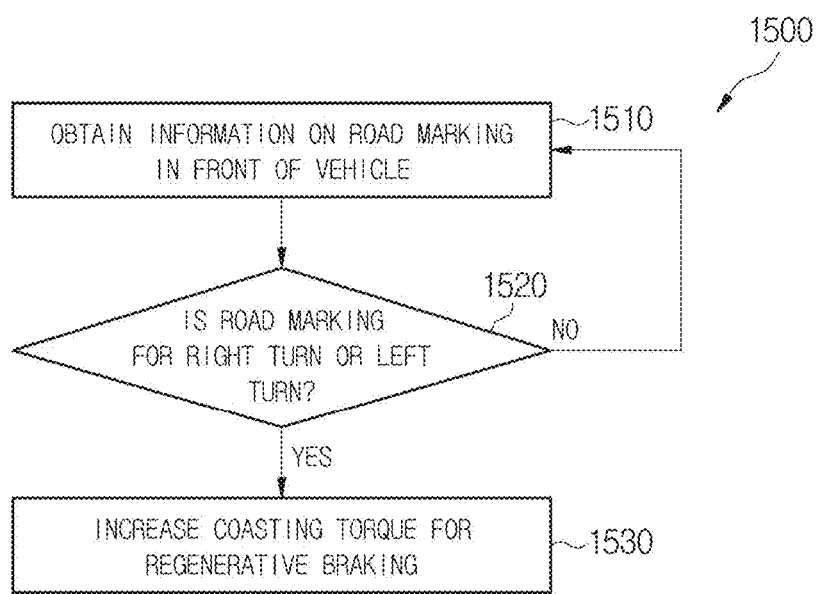
FIG. 10 is a flowchart illustrating a method of controlling a coasting torque to change a traveling direction by a driving assistance apparatus according to one embodiment.
Figure 11:
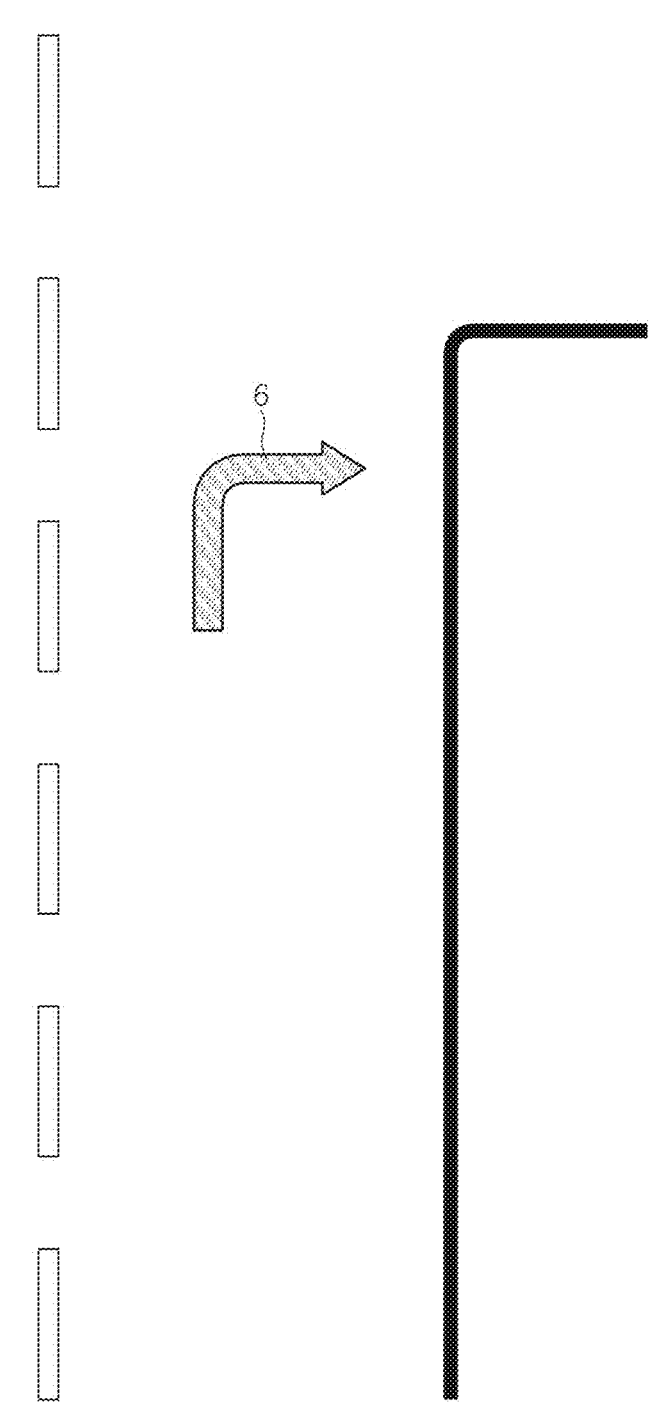
FIG. 11 is a view illustrating an example for changing a traveling direction by a driving assistance apparatus according to one embodiment.

FIG. 10 is a flowchart illustrating a method of controlling a coasting torque to change a traveling direction by a driving assistance apparatus according to one embodiment. FIG. 11 is a view illustrating an example for changing a traveling direction by a driving assistance apparatus according to one embodiment.

A method 1500 for controlling a coasting torque to change a traveling direction of the vehicle 1 by the driving assistance apparatus 100 will be described with reference to FIGS. 10 and 11. However, one or more operations shown in FIG. 10 may not be essential for the method 1500, and one or some of the operations shown in FIG. 10 may be omitted.

At operation 1510, the driving assistance apparatus 100 may obtain information on a road marking 6 in front of the vehicle 1.

The control unit 140 of the driving assistance apparatus 100 may obtain information on the road marking 6 in front of the vehicle 1 through the camera 110, the radar 120, and/or the lidar 130. For example, the control unit 140 may identify the road marking 6 around the vehicle 1 on the basis of image data.

At operation 1520, the driving assistance apparatus 100 may identify whether the road marking 6 is a marking for a right turn (or left turn).

The control unit 140 may identify whether the road marking 6 is a marking for a right turn (or left turn) on the basis of the image data of the camera 110. For example, as illustrated in FIG. 11, the control unit 140 may identify whether the road marking 6 is a marking for a right turn (or left turn) by extracting an image of the road marking 6 from the image data of the camera 110 and using image processing, machine learning, or the like.

When the road marking 6 is not a marking for a right turn (or left turn) (NO in operation 1520), the driving assistance apparatus 100 may continue to perform operation 1510 of obtaining information on the road marking 6 in front of the vehicle 1.

At operation 1530, when the road marking 6 is a marking for a right turn (or left turn) (YES in operation 1520), the driving assistance apparatus 100 may increase the coasting torque for regenerative braking.

Operation 1530 may be the same as or similar to operation 1230 shown in FIG. 5. When the road marking 6 is a marking for a right turn (or left turn), the driver may be predicted to decelerate to change a traveling direction of the vehicle 1. The control unit 140 may increase the coasting torque (or coasting torque level) for regenerative braking to smoothly decelerate the vehicle 1.

Accordingly, the vehicle 1 can be smoothly decelerated, and the fuel efficiency or electric efficiency of the vehicle 1 can be improved.

When the vehicle 1 turns right (or left) after the coasting torque is increased, the driving assistance apparatus 100 may decrease the coasting torque for regenerative braking.

Figure 12:
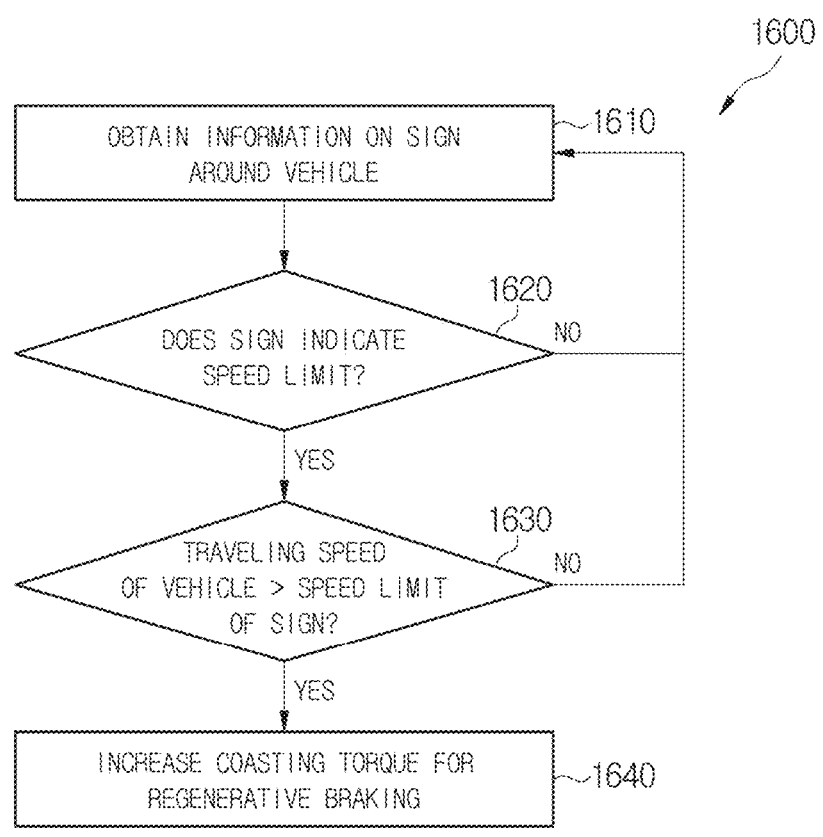
FIG. 12 is a flowchart illustrating a method of controlling a coasting torque by identifying a sign by a driving assistance apparatus according to one embodiment.

FIG. 12 is a flowchart illustrating a method of controlling a coasting torque by identifying a sign by a driving assistance apparatus according to one embodiment.

A method 1600 for controlling a coasting torque by identifying a sign by the driving assistance apparatus 100 will be described with reference to FIG. 12, However, one or more operations shown in FIG. 12 may not be essential for the method 1600, and one or some of the operations shown in FIG. 12 may be omitted.

At operation 1610, the driving assistance apparatus 100 may obtain information on the sign around the vehicle 1.

The control unit 140 of the driving assistance apparatus 100 may obtain information on the sign around the vehicle 1 through the camera 110, the radar 120, and/or the lidar 130. For example, the control unit 140 may identify the sign around the vehicle 1 on the basis of image data.

At operation 1620, the driving assistance apparatus 100 may identify whether the sign included in the image data is a sign indicating a speed limit.

The control unit 140 may identify whether the sign included in the image data is a sign indicating a speed limit on the basis of the image data of the camera 110. For example, the control unit 140 may identify whether the sign included in the image data is a sign indicating a speed limit by extracting an image of the sign from the image data of the camera 110 and performing image processing, machine learning, or the like.

When the sign included in the image data is not a sign indicating a speed limit (NO in operation 1620), the driving assistance apparatus 100 may continue to obtain information on a sign around the vehicle 1.

When the sign included in the image data is a sign indicating a speed limit (YES in 1620), the driving assistance apparatus 100 may identify whether a traveling speed of the vehicle 1 is greater than the speed limit indicated by the sign (1630).

The control unit 140 may obtain information on the acceleration (or deceleration) and/or traveling speed of the vehicle 1 from the vehicle speed sensor 91 and obtain the traveling speed of the vehicle 1 on the basis of the information objected from the vehicle speed sensor 91.

The control unit 140 may obtain the speed limit on the basis of the image data of the camera 110. For example, the control unit 140 may identify characters, numbers, or symbols on an image of a sign included in the image data of the camera 110 by extracting the image of the sign from image data of the camera 110 and performing image processing, machine learning, or the like.

The control unit 140 may compare the traveling speed of the vehicle 1 with the speed limit indicated by the sign identified from the image data of the camera 110 and may identify whether the traveling speed of the vehicle 1 is greater than the speed limit.

When the traveling speed of the vehicle 1 is not over the speed limit indicated by the sign identified from the image data of the camera 110 (NO in operation 1630), the driving assistance apparatus 100 may perform operation 1610 of obtaining information on a sign around the vehicle 1 from the image data of the camera 110 again.

At operation 1640, when the traveling speed of the vehicle 1 is over the speed limit indicated by the sign identified from the image data of the camera 110 (YES in operation 1630), the driving assistance apparatus 100 may increase the coasting torque for regenerative braking.

Operation 1640 of FIG. 12 may be the same as or similar to operation 1230 shown in FIG. 5. The control unit 140 may increase the coasting torque (or coasting torque level) for regenerative braking in order to quickly and efficiently decelerate the vehicle 1. Accordingly, a violation of a speed limit by the vehicle 1 can avoided, and the fuel efficiency or electric efficiency of the vehicle 1 can be improved.

When the traveling speed of the vehicle 1 is below the speed limit after the coasting torque is increased, the driving assistance apparatus 100 may decrease the coasting torque for regenerative braking.

Figure 13:
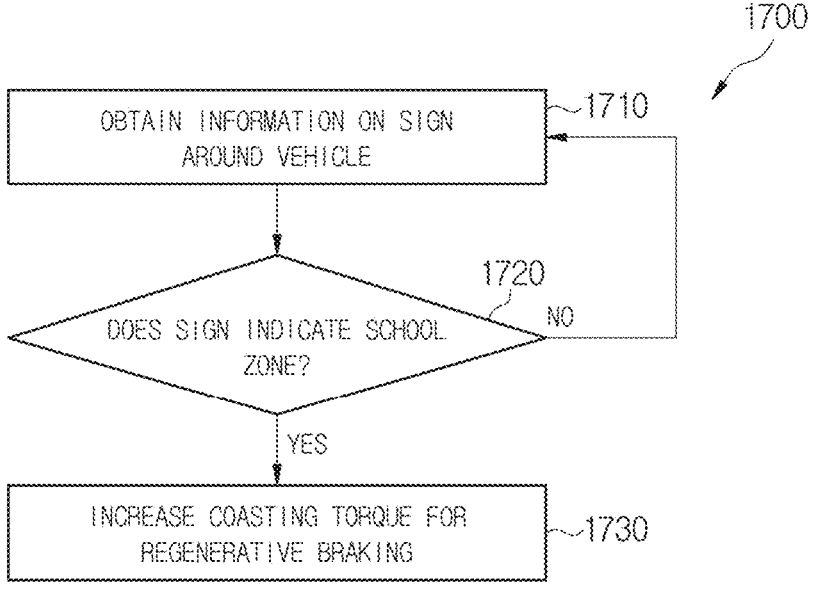
FIG. 13 is a flowchart illustrating a method of controlling a coasting torque by identifying a sign by a driving assistance apparatus according to one embodiment.

FIG. 13 is a flowchart illustrating a method of controlling a coasting torque by identifying a sign by a driving assistance apparatus according to one embodiment.

A method 1700 for controlling a coasting torque by identifying a sign by the driving assistance apparatus 100 will be described with reference to FIG. 13. However, one or more operations shown in FIG. 13 may not be essential for method 1700, and one or some of the operations shown in FIG. 13 may be omitted.

At operation 1710, the driving assistance apparatus 100 may obtain information on a sign around the vehicle 1.

Operation 1710 may be the same as or similar to operation 1610 shown in FIG. 12.

At operation 1720, the driving assistance apparatus 100 may identify whether the sign included in the objected information indicates a school zone.

The control unit 140 may identify whether the sign included in the objected information indicates a school zone on the basis of image data of the camera 110. For example, the control unit 140 may identify whether the sign included in the objected information indicates a school zone by extracting an image of the sign from the image data of the camera 110 and performing image processing, machine learning, or the like.

When the sign included in the objected information indicates a school zone (NO in operation 1720), the driving assistance apparatus 100 may perform operation 1710 of obtaining information on a sign around the vehicle 1 again.

At operation 1730, when the sign included in the objected information indicates a school zone (YES in operation 1720), the driving assistance apparatus 100 may increase the coasting torque for regenerative braking.

Operation 1730 may be the same as or similar to operation 1230 shown in FIG. 5. The control unit 140 may increase the coasting torque (or coasting torque level) for regenerative braking in order to quickly and efficiently decelerate the vehicle 1. Accordingly, an accident in the school zone can be reduced or avoided, and the fuel efficiency or electric efficiency of the vehicle 1 can be improved.

Figure 14:
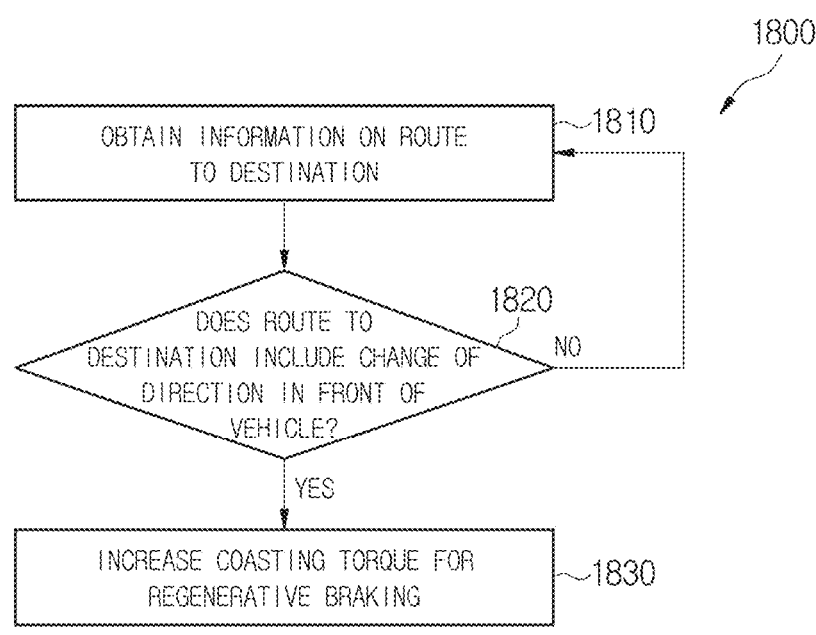
FIG. 14 is a flowchart illustrating a method of controlling a coasting torque on the basis of a route to a destination by a driving assistance apparatus according to one embodiment.

FIG. 14 is a flowchart illustrating a method of controlling a coasting torque on the basis of a route to a destination by a driving assistance apparatus according to one embodiment.

A method 1800 for controlling a coasting torque according to a route to a destination by the driving assistance apparatus 100 will be described with reference to FIG. 14. However, one or more operations shown in FIG. 14 may not be essential for the method 1800, and one or some of the operations shown in FIG. 14 may be omitted.

At operation 1810, the driving assistance apparatus 100 may obtain information on a route to a destination of the vehicle 1.

The driving assistance apparatus 100 may obtain the information on the route to the destination of the vehicle 1 input by the driver from the navigation device or navigator 10. For example, the control unit 140 of the driving assistance apparatus 100 may obtain information on a route on which the vehicle 1 will travel for a predetermined time from the navigation device 10 through the vehicle communication network.

At operation 1820, the driving assistance apparatus 100 may identify whether the route to the destination includes a change of direction (for example, right turn or left turn) in front of the vehicle 1.

The control unit 140 may identify whether there is a change of direction (for example, right turn or left turn) in front of the vehicle 1 on the basis of the route on which the vehicle 1 will travel for a predetermined time obtained from the navigation device 10.

When the route to the destination does not include a change of direction in front of the vehicle 1 (NO in operation 1820), the driving assistance apparatus 100 may perform operation 1810 of obtaining information on the route to the destination of the vehicle 1 again.

At operation 1830, when the route to the destination includes a change of direction in front of the vehicle 1 (YES in operation 1820), the driving assistance apparatus 100 may increase the coasting torque for regenerative braking.

Operation 1830 may be the same as or similar to operation 1230 shown in FIG. 5. When the route to the destination includes a change of direction in front of the vehicle 1, the driver may be predicted to decelerate to change a traveling direction of the vehicle 1. The control unit 140 may increase the coasting torque (or coasting torque level) for regenerative braking in order to smoothly decelerate the vehicle 1.

Accordingly, the vehicle 1 can smoothly decelerate, and the fuel efficiency or electric efficiency of the vehicle 1 can be improved.

When the vehicle 1 changes directions (for example, turns right or left) after the coasting torque is increased, the driving assistance apparatus 100 may decrease the coasting torque for regenerative braking.

Figure 15:
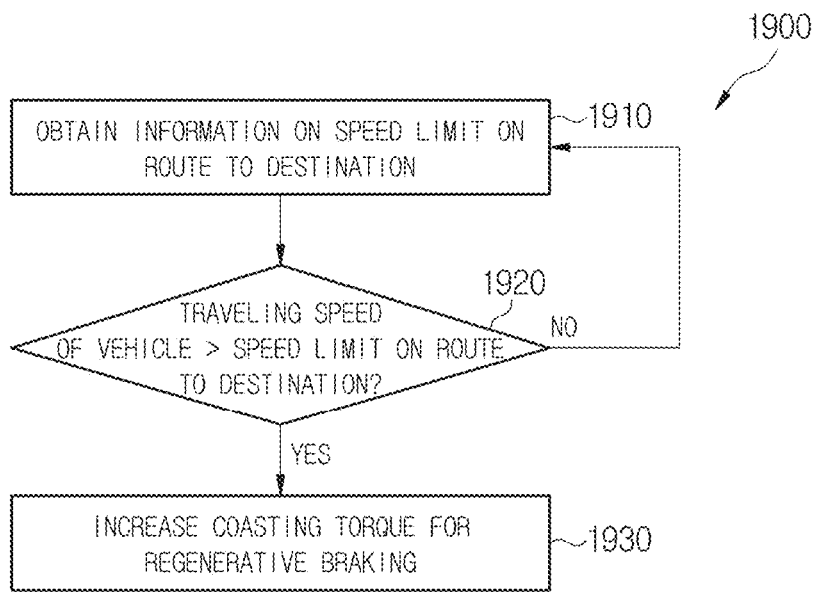
FIG. 15 is a flowchart illustrating a method of controlling a coasting torque on the basis of a speed limit by a driving assistance apparatus according to one embodiment.

FIG. 15 is a flowchart illustrating a method of controlling a coasting torque on the basis of a speed limit by a driving assistance apparatus according to one embodiment.

A method 1900 for controlling a coasting torque on the basis of a speed limit by the driving assistance apparatus 100 will be described with reference to FIG. 15. However, one or operations shown in FIG. 15 may not be essential for the method 1900, and one or some of the operations shown in FIG. 15 may be omitted.

At operation 1910, the driving assistance apparatus 100 may obtain information on a speed limit to a destination of the vehicle 1.

For instance, the driving assistance apparatus 100 may obtain information on a route to the destination input by the driver and information on the speed limit on the route to the destination from the navigation device 10 of the vehicle 1. For example, the control unit 140 of the driving assistance apparatus 100 may obtain information on a route on which the vehicle 1 will travel for a predetermined time and information on a speed limit on the route on which the vehicle 1 will travel from the navigation device 10 through the vehicle communication network.

At operation 1920, the driving assistance apparatus 100 may identify whether a traveling speed of the vehicle 1 is greater the speed limit on the route on which the vehicle 1 will travel.

The control unit 140 may obtain information on the acceleration (or deceleration) and/or traveling speed of the vehicle 1 from the vehicle speed sensor 91 and may obtain the traveling speed of the vehicle 1 on the basis of the information obtained from the vehicle speed sensor 91.

The control unit 140 may compare the traveling speed of the vehicle 1 with the speed limit on the route on which the vehicle 1 will travel and may identify whether the traveling speed of the vehicle 1 is greater than the speed limit.

When the traveling speed of the vehicle 1 is not greater than the speed limit indicated by the sign (NO in 1920), the driving assistance apparatus 100 may perform operation 1910 of obtaining information on a speed limit to the destination of the vehicle 1 again.

At operation 1930, when the traveling speed of the vehicle 1 is greater than the speed limit indicated by the sign (YES in operation 1920), the driving assistance apparatus 100 may increase the coasting torque for regenerative braking.

Operation 1930 may be the same as or similar to operation 1230 shown in FIG. 5. The control unit 140 may increase the coasting torque (or coasting torque level) for regenerative braking in order to quickly and efficiently decelerate the vehicle 1 so as to comply with the speed limit. Accordingly, a violation of the speed limit by the vehicle 1 can be avoided, and the fuel efficiency or electric efficiency of the vehicle 1 can be improved.

When the traveling speed of the vehicle 1 is not greater than the speed limit after the coasting torque is increased, the driving assistance apparatus 100 may decrease the coasting torque for regenerative braking.

Figure 16:
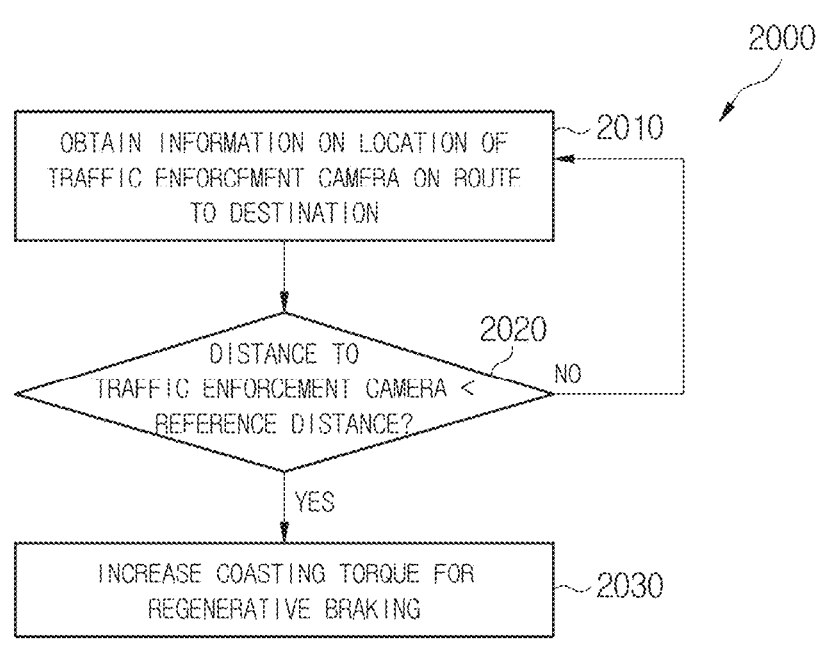
FIG. 16 is a flowchart illustrating a method of controlling a coasting torque on the basis of a location of a traffic enforcement camera by driving assistance apparatus according to one embodiment.

FIG. 16 is a flowchart illustrating a method of controlling a coasting torque on the basis of a location of a traffic enforcement camera by driving assistance apparatus according to one embodiment.

A method 2000 controlling a coasting torque on the basis of a location of a traffic enforcement camera by the driving assistance apparatus 100 will be described with reference to FIG. 16. However, one or more operations shown in FIG. 16 may not be essential for the method 2000, and one or some of the operations shown in FIG. 16 may be omitted.

At operation 2010, the driving assistance apparatus 100 may obtain information on a location of a traffic enforcement camera on a route to a destination of the vehicle 1.

The driving assistance apparatus 100 may obtain information on the route to the destination input by the driver and information on the location of the traffic enforcement camera on the route to the destination from the navigation device 10 of the vehicle 1. For example, the control unit 140 of the driving assistance apparatus 100 may obtain information on a route on which the vehicle 1 will travel for a predetermined time and information on a location of a traffic enforcement camera on the route on which the vehicle 1 will travel from the navigation device 10 through the vehicle communication network.

At operation 2020, the driving assistance apparatus 100 may identify whether a distance to the traffic enforcement camera is shorter than a reference distance.

The control unit 140 may determine the distance to the traffic enforcement camera on the basis of the location of the traffic enforcement camera on the route on which the vehicle 1 will travel.

The reference distance may be set empirically or experimentally. For example, the reference distance may be set to 1 km.

The control unit 140 may compare the distance to the traffic enforcement camera with the reference distance and may identify whether the distance to the traffic enforcement camera is shorter than the reference distance.

When the distance to the traffic enforcement camera is not shorter than the reference distance (NO in operation 2020), the driving assistance apparatus 100 may perform operation 2010 of obtaining information on the location of the traffic enforcement camera on the route to the destination of the vehicle 1 again.

At operation 2030, when the distance to the traffic enforcement camera is shorter than the reference distance (YES in operation 2020), the driving assistance apparatus 100 may increase the coasting torque for regenerative braking.

Operation 2030 may be the same as or similar to operation 1230 shown in FIG. 5. The control unit 140 may increase the coasting torque (or coasting torque level) for regenerative braking in order to quickly and efficiently decelerate the vehicle 1 in front of the traffic enforcement camera. Accordingly, a violation of the speed limit by the vehicle 1 can be avoided, and the fuel efficiency or electric efficiency of the vehicle 1 can be improved.

When the vehicle 1 passes by the traffic enforcement camera After the coasting torque is increased, the driving assistance apparatus 100 may decrease the coasting torque for regenerative braking.

According to an aspect of the present disclosure, a driving assistance apparatus and a method of controlling the same may control the regenerative braking of a vehicle on the basis of information on an environment around the vehicle.

According to an aspect of the present disclosure, a driving assistance apparatus and a method of controlling the same may control the regenerative braking of a vehicle on the basis of information on an obstacle or object interfering with driving of the vehicle.

According to an aspect of the present disclosure, a driving assistance apparatus and a method of controlling the same may control the regenerative braking of a vehicle on the basis of information on traffic infrastructure such as a traffic light, a road marking, or a sign.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A driving assistance apparatus comprising:

a camera associated with a host vehicle and configured to generate image data around the host vehicle; and a processor configured to:

obtain information on a position of an accelerator pedal of the host vehicle and information on a position of a brake pedal of the host vehicle; and when both the accelerator pedal and the brake pedal are not pressed by a driver, control a coasting torque for regenerative braking based on the image data around the host vehicle.

2. The driving assistance apparatus of claim 1, wherein the processor is configured to, when at least either one of the accelerator pedal and the brake pedal is pressed by the driver, increase a preset value of the coasting torque for regenerative braking based on the image data.

3. The driving assistance apparatus of claim 1, wherein the processor is configured to:

determine whether the vehicle needs to decelerate or brake based on the image data; and increase the coasting torque for regenerative braking based on determination of whether deceleration or brake of the host vehicle is needed based on the image data.

4. The driving assistance apparatus of claim 3, wherein the processor is configured to, when the deceleration or the brake of the host vehicle is not needed, decrease the increased coasting torque.

5. The driving assistance apparatus of claim 1, wherein the processor is configured to:

estimate a time to collision of the host vehicle with a preceding vehicle based on the image data; and increase the coasting torque for regenerative braking based on the estimated time to collision of the host vehicle with the preceding vehicle.

6. The driving assistance apparatus of claim 1, wherein the processor is configured to:

calculate a distance from the host vehicle to a preceding vehicle based on the image data; and increase the coasting torque for regenerative braking based on the calculated distance from the host vehicle to the preceding vehicle.

7. The driving assistance apparatus of claim 1, wherein the processor is configured to:

identify an object in front of the host vehicle based on the image data; and when the identified object is at least one of a pedestrian, a cyclist, or an animal, increase the coasting torque for regenerative braking.

8. The driving assistance apparatus of claim 1, wherein the processor is configured to:

identify a traffic signal of a traffic light in front of the host vehicle based on the image data; and when the identified traffic signal of the traffic light is a traffic signal requiring stopping of the host vehicle, increase the coasting torque for regenerative braking.

9. The driving assistance apparatus of claim 1, wherein the processor is configured to:

identify a road marking on a road on which the host vehicle is travelling based on the image data; and when the identified road marking is at least one of a stop marking, a crosswalk warning marking, a right turn marking, or a left turn marking, increase the coasting torque for regenerative braking.

10. The driving assistance apparatus of claim 1, wherein the processor is configured to:

identify a speed limit on a road on which the vehicle is travelling based on the image data; and in response to a traveling speed of the host vehicle being greater than the identified speed limit, increase the coasting torque for regenerative braking.

11. A driving assistance method comprising:

obtaining image data around a host vehicle from a camera associated with the host vehicle;

obtaining information on a position of an accelerator pedal of the host vehicle and information on a position of a brake pedal of the host vehicle; and when both the accelerator pedal and the brake pedal are not pressed by a driver, controlling a coasting torque for regenerative braking based on the image data around the host vehicle.

12. The driving assistance method of claim 11, further comprising, when at least either one of the accelerator pedal and the brake pedal is pressed by the driver, increasing a preset value of the coasting torque for regenerative braking based on the image data.

13. The driving assistance method of claim 11, wherein the controlling of the coasting torque for regenerative braking includes:

determining whether the vehicle needs to decelerate or brake based on the image data; and increasing the coasting torque for regenerative braking based on the determining of whether the vehicle needs to decelerate or brake based on the image data.

14. The driving assistance method of claim 13, further comprising, when the deceleration or the brake of the host vehicle is not needed, decreasing the increased coasting torque.

15. The driving assistance method of claim 11, wherein the increasing of the coasting torque for regenerative braking includes:

estimating a time to collision of the host vehicle with a preceding vehicle based on the image data; and increasing the coasting torque for regenerative braking based on the estimated time to collision of the host vehicle with the preceding vehicle.

16. The driving assistance method of claim 11, wherein the controlling of the coasting torque for regenerative braking includes:

calculating a distance from the host vehicle to a preceding vehicle based on the image data; and increasing the coasting torque for regenerative braking based on the calculated distance from the host vehicle to the preceding vehicle.

17. The driving assistance method of claim 11, wherein the controlling of the coasting torque for regenerative braking includes:

identifying an object in front of the host vehicle based on the image data; and when the identified object is at least one of a pedestrian, a cyclist, or an animal, increasing the coasting torque for regenerative braking.

18. The driving assistance method of claim 11, wherein the controlling of the coasting torque for regenerative braking includes:

identifying a traffic signal of a traffic light in front of the host vehicle based on the image data; and when the identified traffic signal of the traffic light is a traffic signal requiring stopping of the host vehicle, increasing the coasting torque for regenerative braking.

19. The driving assistance method of claim 11, wherein the controlling of the coasting torque for regenerative braking includes:

identifying a road marking on a road on which the host vehicle is travelling based on; and when the identified road marking is at least one of a stop marking, a crosswalk warning marking, a right turn marking, or a left turn marking, increasing the coasting torque for regenerative braking.

20. The driving assistance method of claim 11, wherein the controlling of the coasting torque for regenerative braking includes:

identifying a speed limit on a road on which the vehicle is travelling based on the image data; and in response to a traveling speed of the host vehicle being greater than the identified speed limit, increasing the coasting torque for regenerative braking.

* * * * *